United States Patent
Hande et al.

(10) Patent No.: US 11,770,441 B2
(45) Date of Patent: Sep. 26, 2023

(54) FILE DELIVERY FAILURE FEEDBACK AND APPLICATION FEEDBACK

(71) Applicant: QUALCOMM Incorporated, San Diego, CA (US)

(72) Inventors: Prashanth Haridas Hande, San Diego, CA (US); Mina Makar, San Diego, CA (US); Jay Kumar Sundararajan, San Diego, CA (US); Yeliz Tokgoz, San Diego, CA (US); Xipeng Zhu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 209 days.

(21) Appl. No.: 16/890,550

(22) Filed: Jun. 2, 2020

(65) Prior Publication Data

US 2020/0389515 A1     Dec. 10, 2020

Related U.S. Application Data

(60) Provisional application No. 62/859,476, filed on Jun. 10, 2019, provisional application No. 62/858,674, filed on Jun. 7, 2019.

(51) Int. Cl.
*H04L 67/00* (2022.01)
*H04L 67/06* (2022.01)
(Continued)

(52) U.S. Cl.
CPC ............ *H04L 67/06* (2013.01); *H04M 15/66* (2013.01); *H04W 8/08* (2013.01);
(Continued)

(58) Field of Classification Search
None
See application file for complete search history.

(56) References Cited

U.S. PATENT DOCUMENTS 7,150,017 B1    12/2006 Vogl et al.
9,209,995 B2 *  12/2015 Ansari .................... H04L 67/53
(Continued)

FOREIGN PATENT DOCUMENTS

WO      2019065617 A1    4/2019
WO  WO-2019197461 A1 * 10/2019  ........ H04W 52/0216

OTHER PUBLICATIONS

"3rd Generation Partnership Project; Technical Specification Group Services and System Aspects; System Architecture for the 5G System; Stage 2 (Release 16)", 3GPP Draft, V16.1.0, Draft_23501-G10_CRS_IMPLEMENTED, 3rd Generation Partnership Project (3GPP), Mobile Competence Centre, 650, Route Des Lucioles, F-06921 Sophia-Antipolis Cedex, France, vol. SA WG2, Jun. 3, 2019 (Jun. 3, 2019), XP051751815, pp. 1-367 Retrieved from the Internet: URL: http://www.3gpp.org/ftp/tsg%5Fsa/WG2%5FArch/Latest%5FSA2%5FSpecs/DRAFT%5FINTERIM/DRAFT%5F23501%2Dg10%5FCRs%5FImplemented%2Ezip, [retrieved on Jun. 3, 2019], Chapter 4.2.3.

(Continued)

*Primary Examiner* — Gerald A Smarth
(74) *Attorney, Agent, or Firm* — Patterson + Sheridan, L.L.P.

(57) ABSTRACT

Certain aspects of the present disclosure provide techniques for file delivery feedback and/or application feedback for certain application services. An example method generally includes communicating files with a user equipment (UE), each of the files having a plurality of packets, determining that a delivery failure occurred for at least one of the files, and sending, to a server entity, a notification of the delivery failure.

25 Claims, 18 Drawing Sheets

(51) Int. Cl.
*H04W 80/10* (2009.01)
*H04W 28/02* (2009.01)
*H04W 48/16* (2009.01)
*H04M 15/00* (2006.01)
*H04W 8/08* (2009.01)

(52) U.S. Cl.
CPC ....... *H04W 28/0268* (2013.01); *H04W 48/16* (2013.01); *H04W 80/10* (2013.01)

(56) References Cited

U.S. PATENT DOCUMENTS

| | | |
|---|---|---|
| 2006/0242153 A1* | 10/2006 | Newberry ............. H04L 69/166 |
| 2011/0317578 A1 | 12/2011 | Tomita et al. |
| 2015/0124605 A1 | 5/2015 | Gholmieh et al. |
| 2015/0149589 A1 | 5/2015 | Hao et al. |
| 2019/0104169 A1* | 4/2019 | Wu ........................ H04L 67/10 |
| 2019/0158985 A1* | 5/2019 | Dao ...................... H04L 67/147 |
| 2019/0223250 A1* | 7/2019 | Dao ........................ H04L 67/62 |

OTHER PUBLICATIONS

Partial International Search Report—PCT/US2020/035926—ISAEPO—dated Sep. 10, 2020.
International Search Report and Written Opinion—PCT/US2020/035926—ISA/EPO—dated Nov. 25, 2020.

* cited by examiner

| 5QI Value | PDB | PER | Default MDBV | Example Services |
|---|---|---|---|---|
| 1 | 100 ms | $10^{-2}$ | N/A | Conversation Voice |
| 2 | 150 ms | $10^{-3}$ | N/A | Conversational Video |
| 6, 8, 9 | 300 ms | $10^{-6}$ | N/A | Video; TCP-based |
| ... | ... | ... | ... | ... |
| 80 | 10 ms | $10^{-6}$ | N/A | Low Latency eMBB applications; Augment Reality |
| 81 | 5 ms | $10^{-5}$ | 160 B | Remote Control |
| ... | ... | ... | ... | ... |

FIG. 3

|  | VR Split Rendering | AR Split Computation | Cloud Gaming |
|---|---|---|---|
| HMD/Device | Head-mounted with 5G modem attached 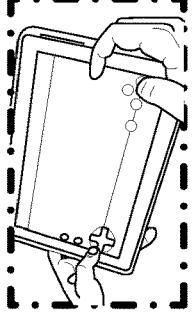 | Head-mounted with USB/Bluetooth connection to "Puck" or Smartphone with 5G modem  | 5G Smartphone or Tablet  |
| 5G Usage | QoS | QoS | OTT/QoS |
| Location | Enterprise-Indoor, Residential-Indoor, Outdoor | Enterprise-Indoor, Outdoor | Outdoor |
| Mobility | Limited to head movements and restricted body movements, Hi-speed (VR in the back of a car) | Pedestrian, Hi-Speed | Static, Hi-speed |

FILE DELIVERY FAILURE FEEDBACK AND APPLICATION FEEDBACK

CROSS-REFERENCE TO RELATED APPLICATIONS

The present Application for Patent claims priority to U.S. Provisional Application No. 62/858,674, filed Jun. 7, 2019, and U.S. Provisional Application No. 62/859,476, filed Jun. 10, 2019, each of which is assigned to the assignee of the present application and hereby expressly incorporated by reference herein in its entirety.

BACKGROUND

Field of the Disclosure

Aspects of the present disclosure relate to wireless communications, and more particularly, to techniques for file delivery failure feedback and application feedback in a wireless communication system.

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipment (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more DUs, in communication with a CU, may define an access node (e.g., which may be referred to as a BS, next generation NodeB (gNB or gNodeB), TRP, etc.). A BS or DU may communicate with a set of UEs on downlink channels (e.g., for transmissions from a BS or DU to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include application feedback in wireless communication systems, where such feedback may enable various actions that adapt to the feedback such as adaptive traffic flows that use a desirable amount of bandwidth.

Certain aspects provide a method for wireless communication. The method generally includes communicating files with a user equipment (UE), each of the files having a plurality of packets, determining that a delivery failure occurred for at least one of the files, and sending, to server entity, a notification of the delivery failure.

Certain aspects provide a method for wireless communication. The method generally includes communicating files with a network entity, each of the files having a plurality of packets, determining that a delivery failure occurred for at least one of the files, and sending, to an application client, a notification of the delivery failure.

Certain aspects provide a method of wireless communication by a network entity. The method generally includes determining a temporary degradation (TD) event associated with communication of data packets between a user-equipment (UE) and a server entity, generating a message indicating the TD event to the server entity, and sending the message to the server entity.

Certain aspects provide a method of wireless communication by a network entity. The method generally includes determining a reduction of a burst rate associated with communication of data packets between a user-equipment (UE) and a server entity, the burst rate comprising a burst rate that is supportable by a communication link between the UE and server entity, generating a message indicating the reduction of the burst rate to the server entity, and sending the message to the server entity.

Certain aspects provide an apparatus for wireless communication. The apparatus generally includes a transceiver configured to communicate files with one of a network entity or a user equipment (UE), each of the files having a plurality of packets. The apparatus also includes a processing system configured to determine that a delivery failure occurred for at least one of the files, and send, to one of an application client or a server entity, a notification of the delivery failure.

Certain aspects provide an apparatus for wireless communication. The apparatus generally includes a processing system configured to determine a temporary degradation (TD) event associated with communication of data packets between a user-equipment (UE) and a server entity, generate a message indicating the TD event to the server entity, and send the message to the server entity. The apparatus also includes a memory coupled to the processing system.

Certain aspects provide an apparatus for wireless communication. The apparatus generally includes a processing system configured to determine a reduction of a burst rate associated with communication of data packets between a user-equipment (UE) and a server entity, the burst rate comprising a burst rate that is supportable by a communication link between the UE and server entity, generate a message indicating the reduction of the burst rate to the server entity, and send the message to the server entity. The apparatus also includes a memory coupled to the processing system.

Certain aspects provide an apparatus for wireless communication. The apparatus generally includes means for communicating files with one of a network entity or a user equipment (UE), each of the files having a plurality of packets, means for determining that a delivery failure occurred for at least one of the files, and means for sending, to one of an application client or a server entity, a notification of the delivery failure.

Certain aspects provide an apparatus for wireless communication. The apparatus generally includes means for determining a temporary degradation (TD) event associated with communication of data packets between a user-equipment (UE) and a server entity, means for generating a message indicating the TD event to the server entity, and means for sending the message to the server entity.

Certain aspects provide an apparatus for wireless communication. The apparatus generally includes means for determining a reduction of a burst rate associated with communication of data packets between a user-equipment (UE) and a server entity, the burst rate comprising a burst rate that is supportable by a communication link between the UE and server entity, means for generating a message indicating the reduction of the burst rate to the server entity, and means for sending the message to the server entity.

Certain aspects provide a computer readable medium having instructions stored thereon for communicating files with one of a network entity or a user equipment (UE), each of the files having a plurality of packets, determining that a delivery failure occurred for at least one of the files, and sending, to one of an application client or a server entity, a notification of the delivery failure.

Certain aspects provide a computer readable medium having instructions stored thereon for determining a temporary degradation (TD) event associated with communication of data packets between a user-equipment (UE) and a server entity, generating a message indicating the TD event to the server entity, and sending the message to the server entity.

Certain aspects provide a computer readable medium having instructions stored thereon for determining a reduction of a burst rate associated with communication of data packets between a user-equipment (UE) and a server entity, the burst rate comprising a burst rate that is supportable by a communication link between the UE and server entity, generating a message indicating the reduction of the burst rate to the server entity, and sending the message to the server entity.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 3 is a table illustrating various fifth generation (5G) quality indicators.

FIG. 4 is a table illustrating various use cases for extended reality (XR).

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for providing file delivery failure feedback and/or application feedback across a wireless communication system to an application client or server, such as an extended reality (XR) client or server. In certain aspects, a radio access network (RAN) may send a delivery failure notification associated with one or more files to a server entity (e.g., the application server). In other aspects, a user equipment (UE) may send a delivery failure notification associated with one or more files to the application client. The notifications may take various feedback paths as further described herein. The notification may enable the application client or the application server to take actions that reduce further delivery failures or rectify the past delivery failure as further described herein. In certain cases, the RAN may determine a temporary degradation (TD) of communication between a UE and server entity (e.g., application server), and provide an indication of the TD to the server entity, allowing the application to adjust data communication parameters for the application accordingly.

Figure 1:
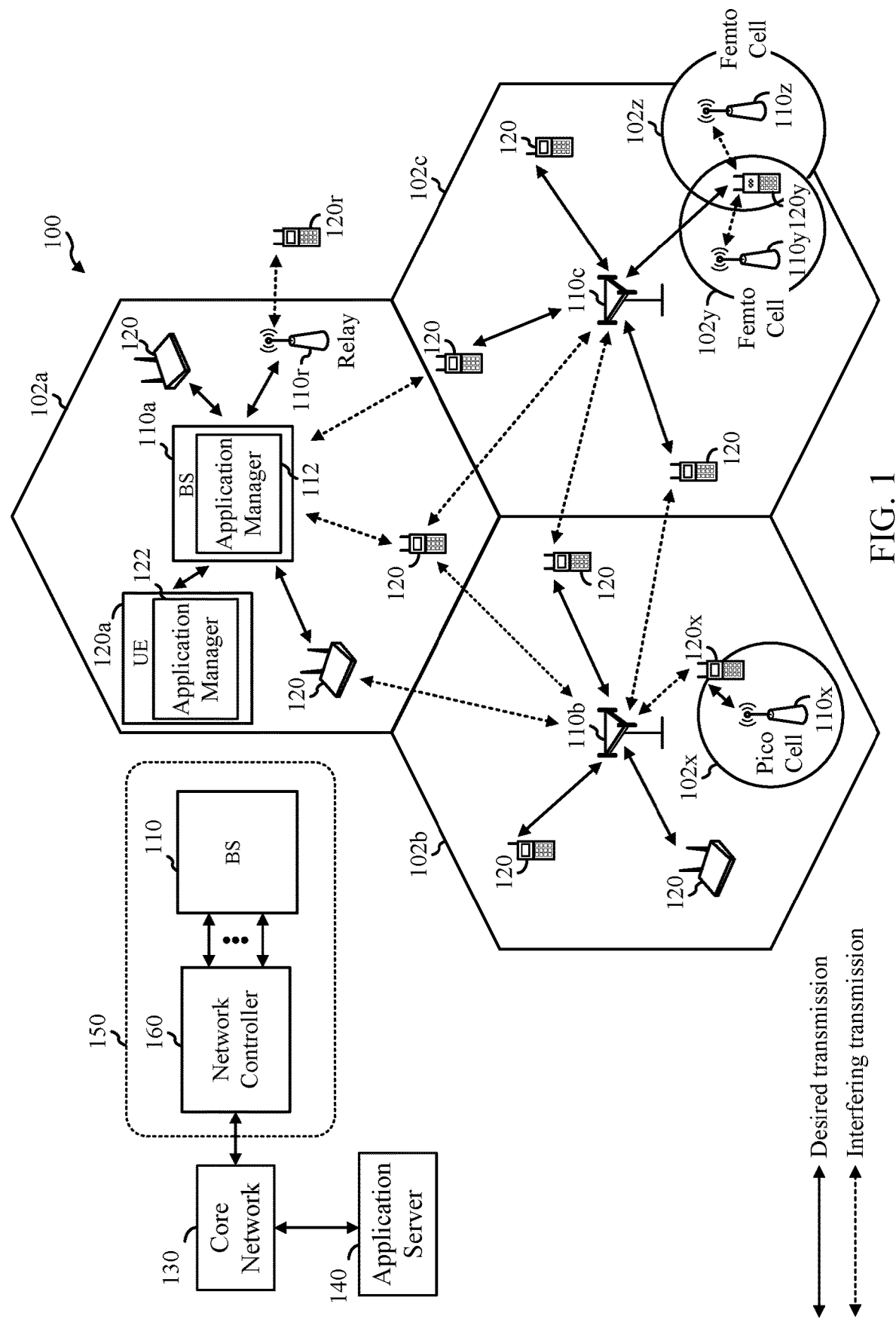
FIG. 1 is a block diagram conceptually illustrating an example telecommunications system, in accordance with certain aspects of the present disclosure.

FIG. 1 illustrates an example wireless communication network 100 in which aspects of the present disclosure may be performed. The wireless communication network 100 may be an NR system (e.g., a 5G NR network). As shown in FIG. 1, the UE 120a has an application manager 122 that may be configured for providing file-based services such as XR, according to aspects described herein. The BS 110a includes an application manager 112 for providing file-based services such as XR, as described in more detail herein. In certain cases, the application manager 112 may be configured to obtain a traffic burst factor (e.g., burst rate). In certain aspects of the present disclosure, the application manager 112 may provide feedback to an application server (e.g., edge cloud server, or server entity) indicating a reduction of a burst rate that is supported by the communication link between the UE and the application server, as described in more detail herein.

The traffic burst factor (e.g., burst rate) may be defined as a multiplicative factor for the GBR associated with a traffic flow (e.g., uplink and/or downlink traffic flow) such that the product of the burst factor times the GBR is the minimum link rate (e.g., minimum constant link rate) for service coverage. Service coverage is said to be met when the number of packets lost or delayed by more than the PDB associated with the traffic flow is smaller than the PER associated with the traffic flow. In some examples, the burst factor may be different uplink and downlink traffic flows.

The burst factor is associated with the coverage and capacity for the service in the wireless network. For example, different traffic flows associated with different traffic burst factors may achieve different levels of service coverage.

A radio access network (RAN) 150 may include the BSs 110 and/or a network controller 160. The RAN 150 may be in communication with a core network (CN) 130 and an application server 140, as discussed in more detail herein with respect to FIG. 2.

According to certain aspects, the BSs 110 and UEs 120 may be configured for one or more services (e.g., URLLC, eMBB, XR, etc.) involving traffic flows between the application provider (e.g., the application server 140) and/or BSs 110 and UEs 120 associated with one or more applications running on the UEs 120. For example, the UE 120a may be requesting admission (e.g., requesting the BS 110a to serve as a link between the UE 120a and the AS 140) for the one or more traffic flows for a service related to an application.

As illustrated in FIG. 1, the wireless communication network 100 may include a number of base stations (BSs) 110 and other network entities. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells. Wireless communication network 100 may also include relay stations. In the example shown in FIG. 1, a relay station 110r may communicate with the BS 110a and a UE 120r in order to facilitate communication between the BS 110a and the UE 120r. A relay station may also be referred to as a relay BS, a relay, etc.

The UEs 120 (e.g., 120x, 120y, etc.) may be dispersed throughout the wireless communication network 100, and each UE may be stationary or mobile. In FIG. 1, a solid line with double arrows indicates desired transmissions between a UE and a serving BS, which is a BS designated to serve the UE on the downlink and/or uplink. A finely dashed line with double arrows indicates potentially interfering transmissions between a UE and a BS.

A network controller 160 may couple to a set of BSs and provide coordination and control for these BSs. The network controller 160 may communicate with the BSs 110 via a backhaul. The BSs 110 may also communicate with one another (e.g., directly or indirectly) via wireless or wireline backhaul.

Figure 2:
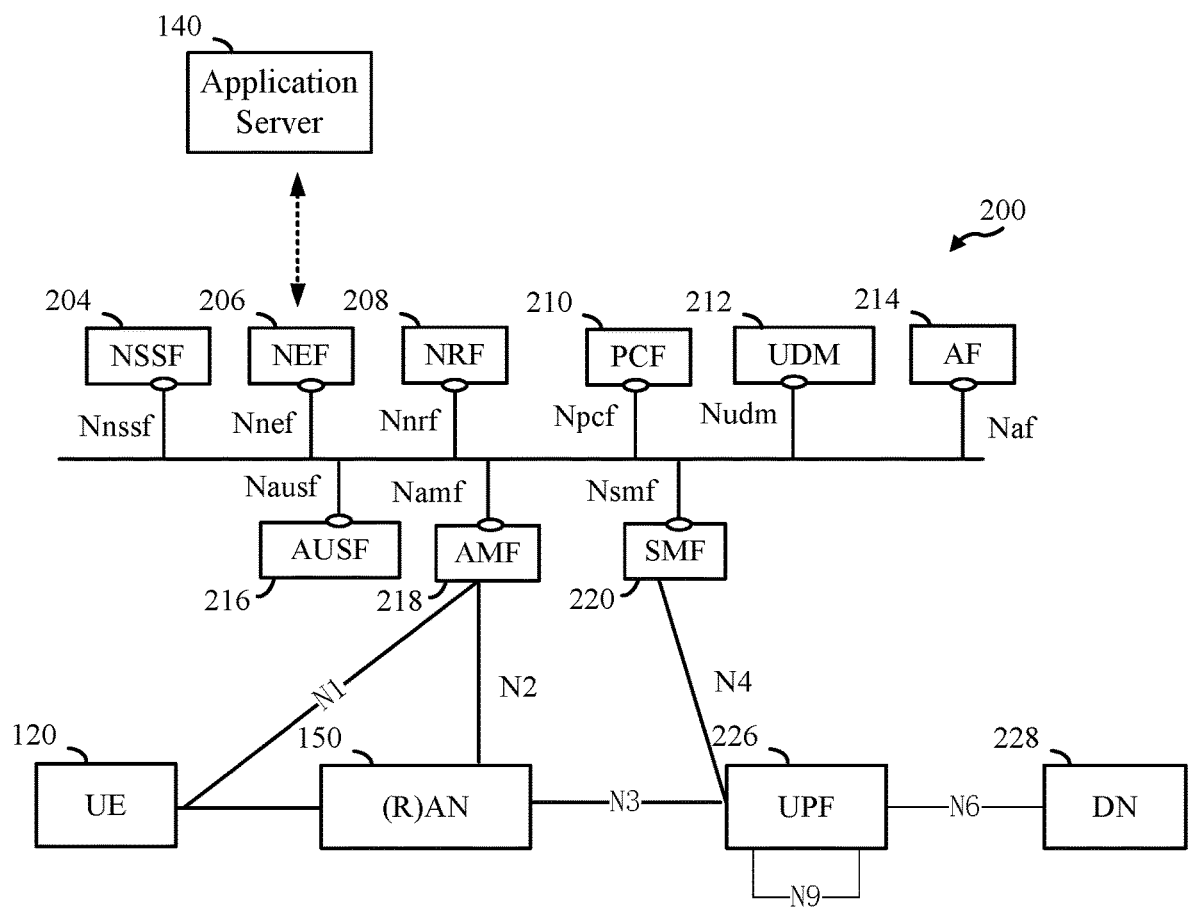
FIG. 2 is a block diagram illustrating an example architecture of a core network (CN) in communication with a radio access network (RAN), in accordance with certain aspects of the present disclosure.

FIG. 2 is a block diagram illustrating an example architecture of a CN 200 (e.g., the CN 130 in FIG. 1) in communication with a RAN 150 and AS 202 (e.g., AS 140 in FIG. 1), in accordance with certain aspects of the present disclosure. As shown in FIG. 2, the example architecture includes the CN 200, RAN 150, UE 120, and data network (DN) 228 (e.g. operator services, Internet access or third party services).

The CN 200 may host core network functions. CN 200 may be centrally deployed. CN 200 functionality may be offloaded (e.g., to advanced wireless services (AWS)), in an effort to handle peak capacity. As shown in FIG. 2, the example CN 200 may be implemented by one or more network entities that perform network functions (NF) including Network Slice Selection Function (NSSF) 204, Network Exposure Function (NEF) 206, NF Repository Function (NRF) 208, Policy Control Function (PCF) 210, Unified Data Management (UDM) 212, Application Function (AF) 214, Authentication Server Function (AUSF) 216, Access and Mobility Management Function (AMF) 218, Session Management Function (SMF) 220; User Plane Function (UPF) 226, and various other functions (not shown) such as Unstructured Data Storage Function (UDSF); Unified Data Repository (UDR); 5G-Equipment Identity Register (5G-EIR); and/or Security Edge Protection Proxy (SEPP).

The AMF 218 may include the following functionality (some or all of the AMF functionalities may be supported in one or more instances of an AMF): termination of RAN control plane (CP) interface (N2); termination of non-access stratum (NAS) (e.g., N1), NAS ciphering and integrity protection; registration management; connection management; reachability management; mobility management; lawful intercept (for AMF events and interface to L1 system); transport for session management (SM) messages between UE 120 and SMF 220; transparent proxy for routing SM messages; access authentication; access authorization; transport for short message service (SMS) messages between UE 120 and a SMS function (SMSF); Security Anchor Functionality (SEAF); Security Context Management (SCM), which receives a key from the SEAF that it uses to derive access-network specific keys; Location Services management for regulatory services; transport for Location Services messages between UE 120 and a location management function (LMF) as well as between RAN 150 and LMF; evolved packet service (EPS) bearer ID allocation for interworking with EPS; and/or UE mobility event notification; and/or other functionality.

SMF 220 may support: session management (e.g., session establishment, modification, and release), UE IP address allocation and management, dynamic host configuration protocol (DHCP) functions, termination of NAS signaling related to session management, downlink data notification, and traffic steering configuration for UPF for proper traffic routing. UPF 226 may support: packet routing and forwarding, packet inspection, quality-of-service (QoS) handling, external protocol data unit (PDU) session point of interconnect to DN 228, and anchor point for intra-RAT and inter-RAT mobility. PCF 210 may support: unified policy framework, providing policy rules to control protocol functions, and/or access subscription information for policy decisions in UDR. AUSF 216 may acts as an authentication server. UDM 212 may support: generation of Authentication and Key Agreement (AKA) credentials, user identification handling, access authorization, and subscription management. NRF 208 may support: service discovery function, and maintain NF profile and available NF instances. NSSF may support: selecting of the Network Slice instances to serve the UE 120, determining the allowed network slice selection assistance information (NSSAI), and/or determining the AMF set to be used to serve the UE 120.

NEF 206 may support: exposure of capabilities and events, secure provision of information from external application to 3GPP network, translation of internal/external information. AF 214 may support: application influence on traffic routing, accessing NEF 206, and/or interaction with policy framework for policy control. As shown in FIG. 2, the CN 200 may be in communication with the AS 202, UE 120, RAN 150, and DN 228. In some examples, the CN 200 communicates with the external AS 202 via the NEF 206 and/or AF 214.

A communication system such as the wireless communication network 100 may provide communication services to the UE 120. For example, 5G NR may support services such as enhanced mobile broadband (eMBB) service targeting wide bandwidth (e.g., 80 MHz or beyond), ultra-reliable low-latency communication (URLLC) service, and others including XR services discussed in more detail below. These services may include latency and reliability requirements. These services may also have different transmission time intervals (TTI) to meet respective quality of service (QoS) requirements.

The traffic requirements for a service may be summarized via a set of parameters (e.g., QoS parameters) and associated with the traffic flow that supports that service. The parameters may include the packet error rate (PER), packet delay budget (PDB), and/or a guaranteed bit rate (GBR) (not shown). The PER may be the ratio, in percent, of successfully received packets. For example, the PER may define an upper bound for the rate of PDUs (e.g. IP packets) that have been processed by the sender of a link layer protocol (e.g. RLC in RAN of a 3GPP access) but that are not successfully delivered by the corresponding receiver to the upper layer (e.g. PDCP in RAN of a 3GPP access). Thus, the PER may define an upper bound for a rate of non-congestion related packet losses. PDB may be defined as an upper bound for the time that a packet may be delayed between the UE (e.g., UE 120) an UPF (e.g., UPF 226) on the CN side. The GBR may indicate the bandwidth (bit rate) to be guaranteed by the network.

A resource type may determine if dedicated network resources related to a QoS flow-level guaranteed flow bit rate (GFBR) value are permanently allocated (e.g., by an admission control function in a radio base station), while a non-GBR QoS flow may be pre-authorized through static policy and charging control. A GBR QoS flow may use either the GBR resource type or the Delay-critical GBR resource type. For traffic flows of type "Delay critical GBR" (e.g., for URLLC traffic flows), a parameter called Maximum Data Burst Volume (MDBV) is specified to describe the traffic burst. The MDBV denotes the largest amount of data that the 5G-AN is required to serve within a period of 5G-AN PDB (e.g., 5G-AN part of the PDB). The MDBV may be signaled together with a standardized indicator value (e.g., 5QI) to the RAN 150, and if it is received, it shall be used instead of the default value.

The Table 300 in FIG. 3 shows example QoS parameters that may be configured for various services. In some examples, the conversational voice service, the conversational video service (e.g., such as live streaming), and the video service (e.g., such as buffered streaming) and/or TCP-based service (e.g., such as the World Wide Web, email, chat, ftp, p2p file sharing, progressive video, etc.) may be associated with eMBB service. In some examples, remote control service (e.g., a UE being operated remotely, either by a human or a computer, such as a remote driver or a V2X application to operate a remote vehicle with no driver or a remote vehicle located in a dangerous environment) may be associated with URLCC. In some examples, the low-latency eMBB applications may be associated with XR service. XR service may refer to services such augmented reality (AR), virtual reality (VR), and cloud gaming. AR and VR service may be characterized by a human being interacting with the environment or people, or controlling a UE, and relying on audio-visual feedback. In the use cases like VR and interactive conversation the latency requirements include the latencies at the application layer (e.g., codecs), which could be specified outside of 3GPP. The QoS parameters and services shown in the Table 300 in FIG. 3 are merely illustrative, and various other QoS parameters and services may be specified.

At high PDB values (e.g., equal to or exceeding 100 ms), the burst of a traffic over the PDB range may be closely approximated by the GBR*PDB. For some traffic flows, measured over every PDB, the percentile of times when the burst exceeds GBR*PDB is small relative to the PER. Dropping packets of such bursts will have negligible effect on the PER of the traffic. Thus, for such traffic flows it may not be important to convey the size of the traffic burst. However, for traffic flows at low PDB and low PER values, the volume of traffic that the 5G system handles can be much higher than GBR*PDB. In this case, it is useful to describe the traffic burst.

As mentioned above, the MDBV is specified for the traffic flows of type "Delay critical GBR" which are expected to handle traffic of low throughput. Thus, in some cases the range of values for MDBV is capped at 4095 Bytes (e.g., when signaled on 5G network interfaces). Even with a PDB of 1 ms, the throughout cap of 4095 Bytes implies that the maximum throughput on that flow can be no more than 4095 Bytes/ms (i.e., around 32.76 Mbps). The supported throughput may be even lower on traffic flows with larger PDB values. However, for certain services, such as XR services (e.g., AR, VR, cloud gaming), the throughput requirements (e.g., up to 250 Mbps) and PDB requirements (e.g., 25 ms) can be higher.

Example File Delivery Failure Feedback

New Radio (NR) is an emerging wireless communications technology under development in conjunction with the 5G Technology Forum (SGTF). NR access (e.g., 5G NR) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements and may also have different transmission time intervals (TTI) to meet respective quality of service (QoS) requirements. Extended reality (XR) may include various services (e.g., cloud gaming, split rendering, split computation, virtual reality (VR), augmented reality (AR), or mixed reality (MR)) that use low latency (e.g., a packet delay budget (PDB) of between 5 ms and 25 ms) communications with a highly reliable bit-rate (e.g., a packet error rate of less than or equal to 1e-3).

FIG. 4 is a table 400 illustrating various use cases for XR. For example, XR traffic flow policies (e.g., latency and reliability requirements) may be used for cloud gaming, VR split rendering, or AR split computations. Cloud gaming generally refers to gaming on a user device where at least some of the graphical processor unit (GPU) processing is performed on a cloud server where more powerful GPUs may be implemented. Similarly, GPU processing for VR and AR may be split between a GPU on the cloud and a GPU on the user device. However, cloud gaming, split rendering, and split computation services use low latency communications to maintain an acceptable gaming or virtual experience. As illustrated, cloud gaming may be implemented using QoS or over the top (OTT) on the 5G network. Moreover, different use cases may have different location and mobility requirements, as illustrated.

Figure 5:
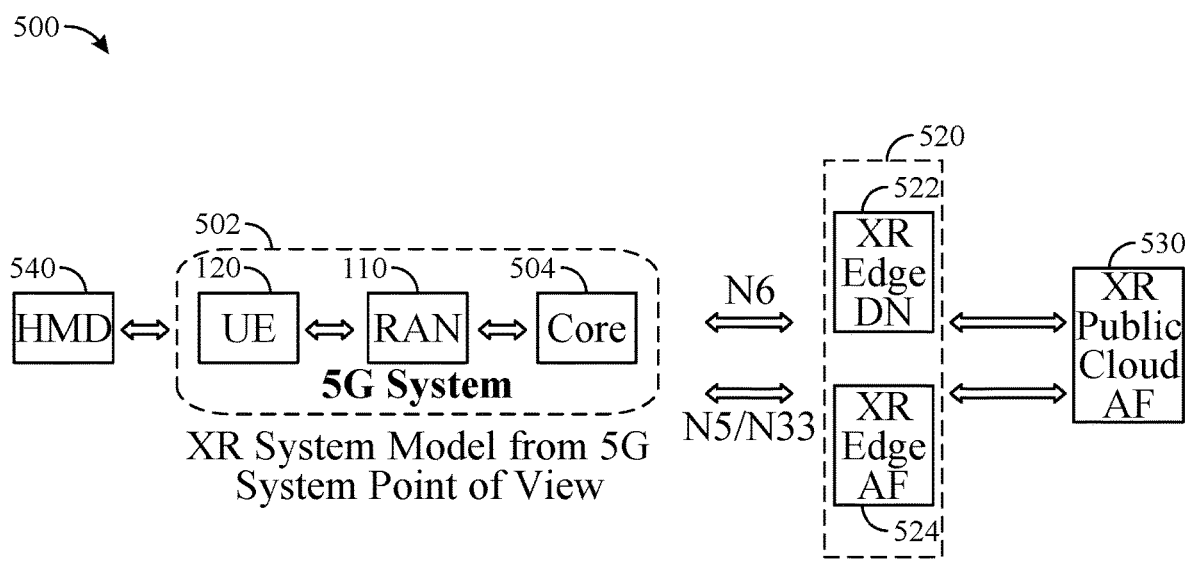
FIG. 5 illustrates a wireless communication system for XR.

FIG. 5 illustrates a wireless communication system 500 for XR. As illustrated, a 5G system 502 may include a UE 120, a RAN 150, and a core network (CN) 504. In certain aspects, the UE 120 may be associated with a head mount display (HMD) 540 for VR or AR applications. As illustrated, the 5G system 502 may communicate with an edge cloud server 520, which may include logical entities such as an XR edge data network (DN) 522 and an XR edge application function 524. An edge cloud server generally refers to a cloud server located closer to the UE, allowing communication of data with lower latency for various applications as described herein. For example, CN to XR edge server latency may be negligible as compared to the 5G system latency. The edge cloud server 520 may be associated with an XR public cloud AF 530, as illustrated. The CN 506 may communicate with the XR edge DN via an N6 interface (user plane). Moreover, the CN 504 may communicate with the XR edge AF via an N5 and N33 interfaces. N5 and N33 are interfaces of the XR edge application function 524 to the 5G system.

Figure 6:
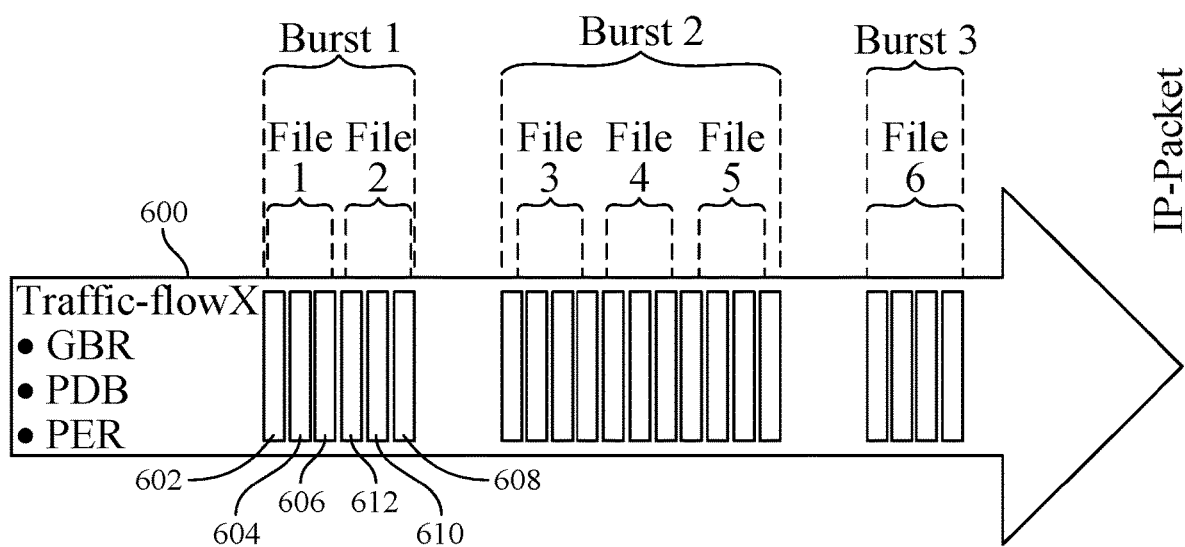
FIG. 6 illustrates a traffic flow for communication of packets associated with various files.

FIG. 6 illustrates a traffic flow 600 for communication of packets associated with various files. For example, packets 602, 604, 606 may be associated with a file (e.g., file1) and packets 608, 610, 612 may be associated with another file (e.g., file2). Files may be sent in multiple bursts. For example, files 1 and 2 may be sent in a first burst (e.g., burst1), files 3, 4, 5, may be in sent in a second burst (e.g., burst2), and file 6 may be sent in a third burst (e.g., burst3), as illustrated. In other words, a file generally refers to a set of packets jointly processed by an application. A file may be broken into packets depending upon maximum transmission unit (MTU) settings on the stack interfacing the application. The packets may be further fragmented into smaller packet fragments. A burst generally refers to one or more files generated by the application at about the same time. The traffic flow 600 may be associated with a certain guaranteed bit rate (GBR) (also referred to as a guaranteed flow bit rate (GFBR)) that may be preconfigured by the RAN 110. Moreover, the traffic flow may be associated with a packet delay budget (PDB) and packet error rate (PER). In some cases, the delivery deadline of a packet may be about equal to the time of arrival (ToA) of the packet plus the PDB of the traffic flow to which the packet belongs.

A 5G wireless communication system may be only aware of packet level metrics. In other words, the traffic flow may be specified via packet filters and metrics via PER and PDB. However, XR applications might specify metrics on a group of packets (e.g., a file). For instance, the XR application may specify a file error rate (FER) rather than PER. Moreover, the reliability requirements of files may vary. For example, the reliability requirements may differ for intra-coded frames (I-frames) versus predicted frames (P-frames) on a XR traffic flow. In some cases, the XR application may specify a policy with regards to file handling. For instance, the XR application may specify that a file may be used only if all packets of a file are received, or that a contiguous stream of packets up to the first packet in error may be used.

When file level metrics such as FER are translated to packet level metrics such as PER for the 5G system, information may be lost, resulting in inaccurate handling of file level requirements of the application. As an example, the application may not have file-level delivery failure information related to XR traffic either from downlink traffic (e.g., from the RAN to the UE) or uplink traffic (e.g., from the UE to the RAN), unless the application implements application client feedback. However, file delivery failure feedback over the air may be delayed, which may hinder the latency of the traffic flow, and introduce extra uplink traffic, which may reduce the bandwidth capacity of the wireless communication system and the reliability of the bit rate.

Certain aspects of the present disclosure are generally directed to techniques for servicing XR applications using file level metrics, such as providing file delivery failure feedback to an application client or server. In certain aspects, the RAN may send a delivery failure notification associated with one or more files to a server entity (e.g., edge cloud server 520). In other aspects, the UE may send a delivery failure notification associated with one or more files to the application client. The notifications may enable the application client or the server entity to take actions that reduce further delivery failures or rectify the past delivery failure. For instance, if a server entity receives a delivery failure notification, the server entity may adjust the compression scheme of the traffic flow to reduce the likelihood of further delivery failures (i.e., increase the likelihood of successful deliveries). As an example, the server entity may change from a predicted frame (P-frame) only compression scheme to a compression scheme that includes P-frames with intra-coded frames (I-frames) on demand based on the feedback notifications described herein. In certain cases, an IPPP-frame stream may use at least 100 Mbps of bandwidth, while a traffic flow that adapts to the delivery feedback described herein may use at least 80 Mbps of bandwith, considerably reducing the bandwidth of the application traffic flow. In other words, the various techniques for file delivery failure notification may enable adaptive traffic flows that use a desirable amount of bandwidth.

Figure 7:
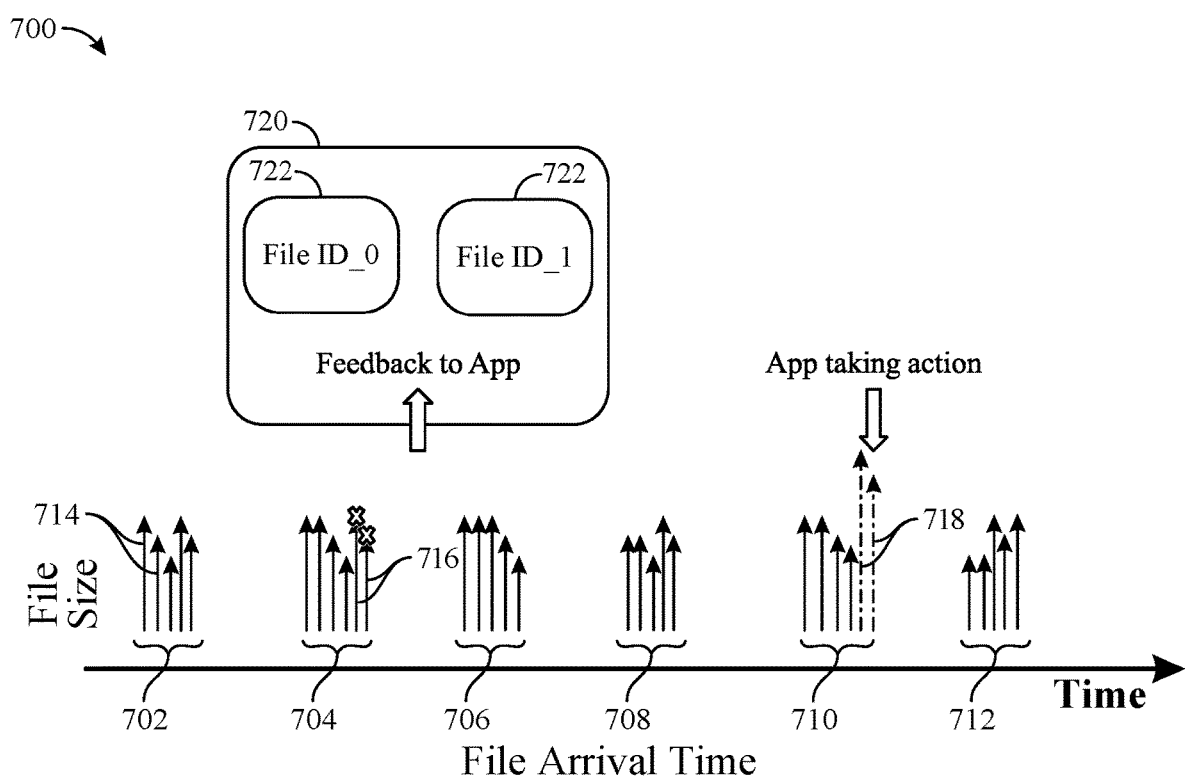
FIG. 7 illustrates an example XR traffic flow of file bursts with file delivery failures, in accordance with certain aspects of the present application.

FIG. 7 illustrates an example XR traffic flow 700 for communication of files, in accordance with certain aspects of the present disclosure. As shown, the traffic flow 700 may be transmitted via bursts 702, 704, 706, 708, 710, 712 including one or more files 714, which may include multiple packets as previously described herein.

Assuming the traffic flow is downlink traffic from the RAN to the UE, the RAN may determine that a delivery failure occurred for the files 716 in the second burst 704. In response to the delivery failure, the RAN may generate a notification 720 comprising one or more file identifiers 722 associated with the file(s) that encountered the delivery failure. That is, the RAN may generate a notification on a per file basis or on a group of files. The RAN may send the notification to the server entity as further described herein.

The application server (e.g., the cloud edge server 520) may take various actions in response to the notification. For example, in response to the notification, the application server may change the compression scheme as indicated by files 718 in the fifth burst 710. The files 718 may use a different type of compression scheme (e.g., I-frame or P-frame) relative to the other files in the traffic flow 700.

The traffic flow 700 may also apply to an uplink traffic flow from the UE to the RAN. For example, the UE may send the notification 720 to an application client, and the application client may take various actions in response to the notification.

Figure 8A:
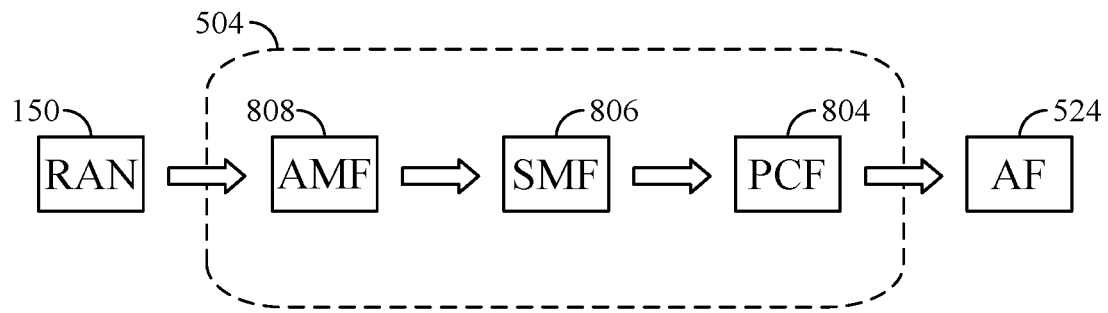
FIG. 8A illustrates an example feedback path for a file delivery failure notification from the RAN to an application function of a server entity, in accordance with certain aspects of the present application.

FIG. 8A illustrates an example feedback path of the file delivery failure notification from the RAN 150 to an application function of the server entity, in accordance with certain aspects of the present disclosure. As shown, the RAN 150 may send one or more notifications to the application via logical functions of the core network 504 including a policy control function (PCF) 804, a session management function (SMF) 806, and an access and mobility management function (AMF) 808. For example, the notification may be sent from the RAN to the AMF 808, from the AMF 808 to the SMF 806, and from the PCF 804 to the AF 524 of the server entity. The feedback path depicted in FIG. 8A may use a Nef interface, such as the communication links to the NEF 206 of FIG. 2. The feedback path depicted in FIG. 8A may be a quality-of-service (QoS) feedback path used to convey QoS feedback to the AF 524.

Figure 8B:
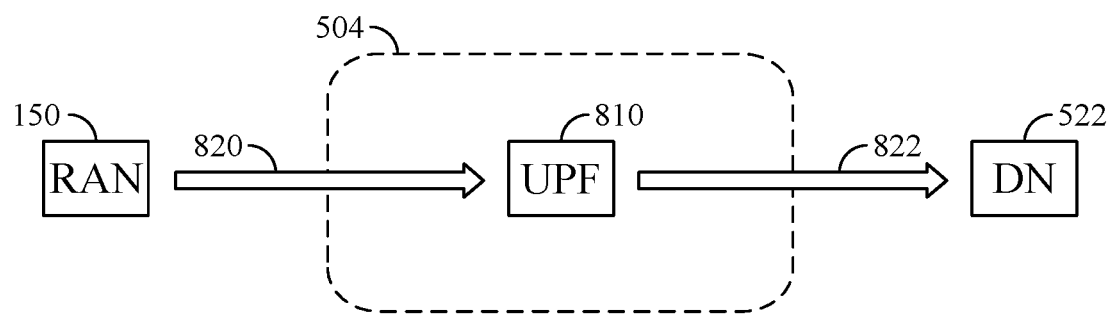
FIG. 8B illustrates another example feedback path for a file delivery failure notification from the RAN to a data network of a server entity, in accordance with certain aspects of the present disclosure.

FIG. 8B illustrates another example feedback path of the file delivery failure notification from the RAN 150 to the server entity via a user plane function, in accordance with certain aspects of the present disclosure. As shown, the RAN 150 may send one or more notifications to the core network 504 having a logical function, such as a user plane function 810, which may forward the notification to the data network 522 of the server entity. The communication flow through the UPF 810 avoids the AF 802 having to forward the feedback to the data network 522, which may result in reducing the delay in notifying the data network 522 of the delivery failure. The RAN 150 may send the notification to the UPF 810 over a feedback interface 820, and the UPF 810 may send the notification to the data network 522 over another feedback interface 822. The feedback interfaces 820 and 822 may be separate interfaces dedicated to communicating feedback to the data network from the RAN.

Figure 8C:
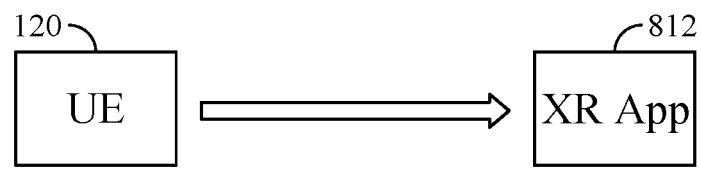
FIG. 8C illustrates an example feedback path for file delivery failure notification from a user equipment to an application client, in accordance with certain aspects of the present disclosure.

FIG. 8C illustrates an example feedback path of the file delivery failure notification from the UE 120 to an application client 812, in accordance with certain aspects of the present disclosure. As shown, the UE 120 may determine that a file delivery occurred on the traffic flow, for example, as shown in FIG. 7, and the UE 120 may send a notification of the file delivery to the application client 812, which may be software components that are executed and run on one or more processors of the UE.

Figure 9A:
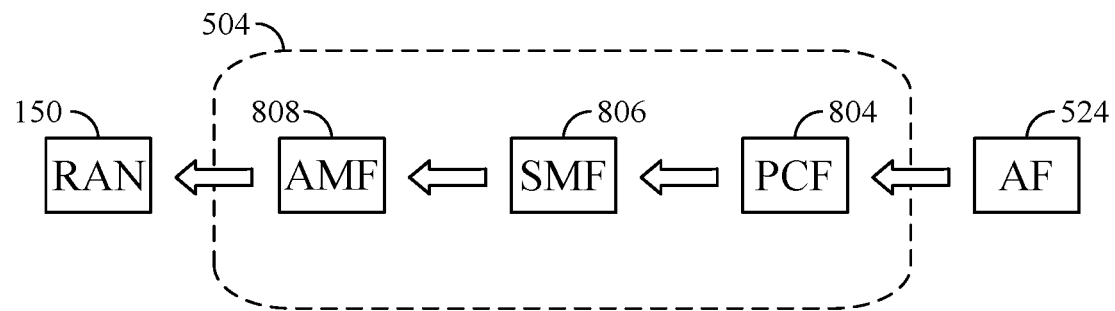
FIG. 9A illustrates an example communication flow of a notification configuration for downlink file delivery failures, in accordance with certain aspects of the present disclosure.

In certain aspects, the application function of the server entity may configure the notification used for file delivery failure feedback. The configuration may be specified for uplink file delivery failures, downlink file delivery failures, or a combination thereof. For instance, FIG. 9A illustrates an example communication flow of a notification configuration for downlink file delivery failures, in accordance with certain aspects of the present disclosure. As shown, the application function 524 of the server entity may send a configuration for the notification to the RAN 150 via the core network 504. The core network 504 may forward the configuration via the logical functions including the PCF 804, SMF 806, and the AMF 808. In certain aspects, the configuration may be sent from the AF 524 of the server eneity to the PCF 804, from the PCF 804 to the SMF 806, and from the AMF 808 to the RAN 150. In aspects, the server entity may specify that the notification is to be sent on a per-file basis or grouped with multiple file failures, as described herein with respect to FIG. 7. That is, the configuration may indicate to send the notification per delivery failure of a file or per delivery failure of a group of files. The configuration may indicate to the RAN 150 whether to use the feedback path as shown in FIG. 8A or the feedback path as shown in FIG. 8B. That is, the configuration may indicate a feedback path for the notification either to the AF of the server entity (e.g., as depicted in FIG. 8A) or to the data network via the UPF of the core network (e.g., as depicted in FIG. 8B).

Figure 9B:
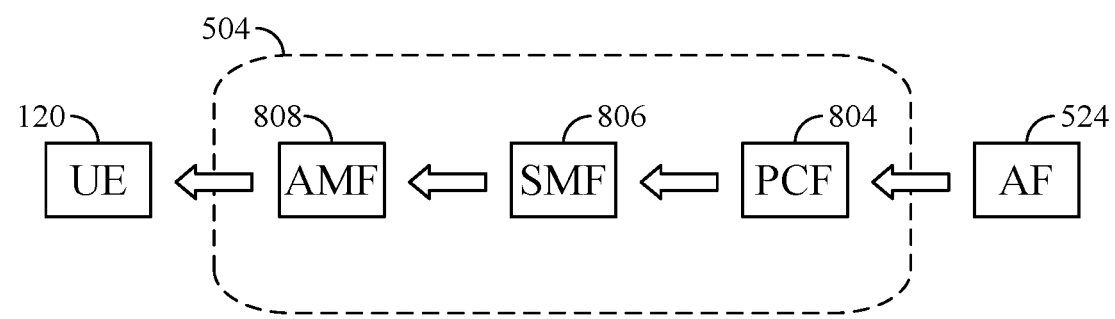
FIG. 9B illustrates an example communication flow of a notification configuration for uplink file delivery failures, in accordance with certain aspects of the present disclosure.

For uplink traffic feedback, the server entity may send an indication of the configuration to the UE. For instance, FIG. 9B illustrates an example communication flow of a notification configuration for uplink file delivery failures, in accordance with certain aspects of the present disclosure. As shown, the application function 524 of the server entity may send a configuration for the notification to the UE 120. The application function 524 may send the configuration via the logical functions including the PCF 804, SMF 806, and the AMF 808. In certain aspects, the configuration may be sent from the AF 524 to the PCF 804, from the PCF 804 to the SMF 806, and from the AMF 808 to the UE 120. In aspects, the configuration may indicate to send the notification per delivery failure of a file or per delivery failure of a group of files.

Figure 10:
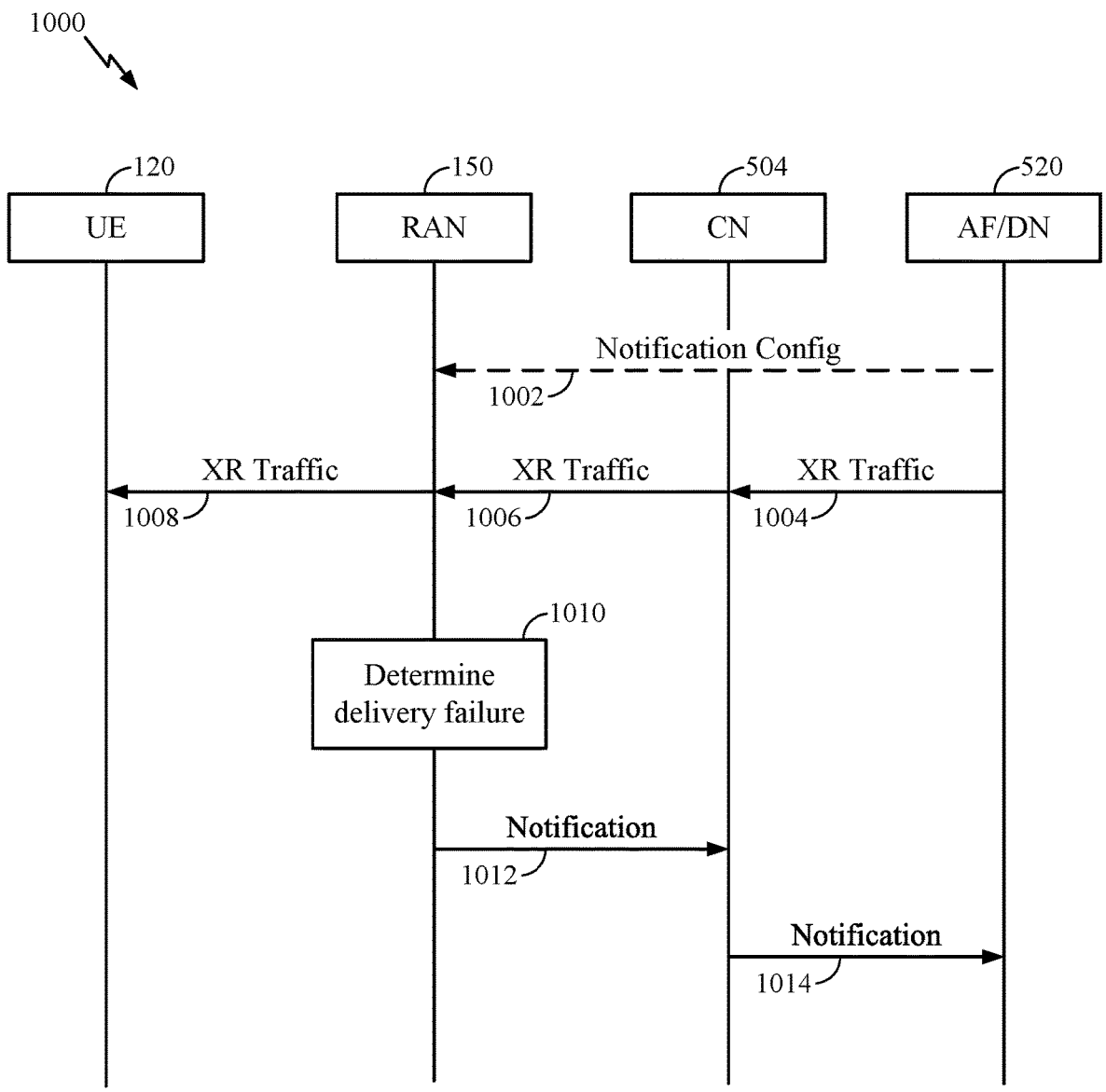
FIG. 10 is a call-flow diagram illustrating example operations for providing file delivery failure notifications on downlink traffic, in accordance with certain aspects of the present disclosure.

FIG. 10 is a call-flow diagram illustrating example operations 1000 for providing file delivery failure notifications on downlink traffic, in accordance with certain aspects of the present disclosure. At 1002, the server entity 520 may send a notification configuration, as described herein with respect to FIG. 9A, to the RAN 150 via the core network 504. At 1004, the server entity 520 may communicate application traffic (e.g., the traffic flow 700) to the core network 504, which may forward the traffic to the RAN 150 at 1006. At 1008, the RAN may transmit the application traffic to the UE 120. The downlink transmission of the application traffic may continue through the remainder of the operations 1000.

At 1010, the RAN 150 may determine that a delivery failure occurred for one or more files being communicated on the application traffic. For example, the RAN 150 may determine that the delivery failure occurred between the CN 504 and RAN 150 or between the RAN 150 and UE 120. At 1012, the RAN 150 may send a file delivery failure notification to the core network 504. In aspects, the RAN 150 may generate the notification in accordance with the configuration received at 1002. At 1014, the core network 504 may forward the notification to the server entity 520, as described herein with respect to FIGS. 8A and 8B. The server entity 520 may then take various actions to rectify the delivery failure or reduce future delivery failures, for example, by resending the file(s) and/or changing the compression scheme of the application traffic.

Figure 11:
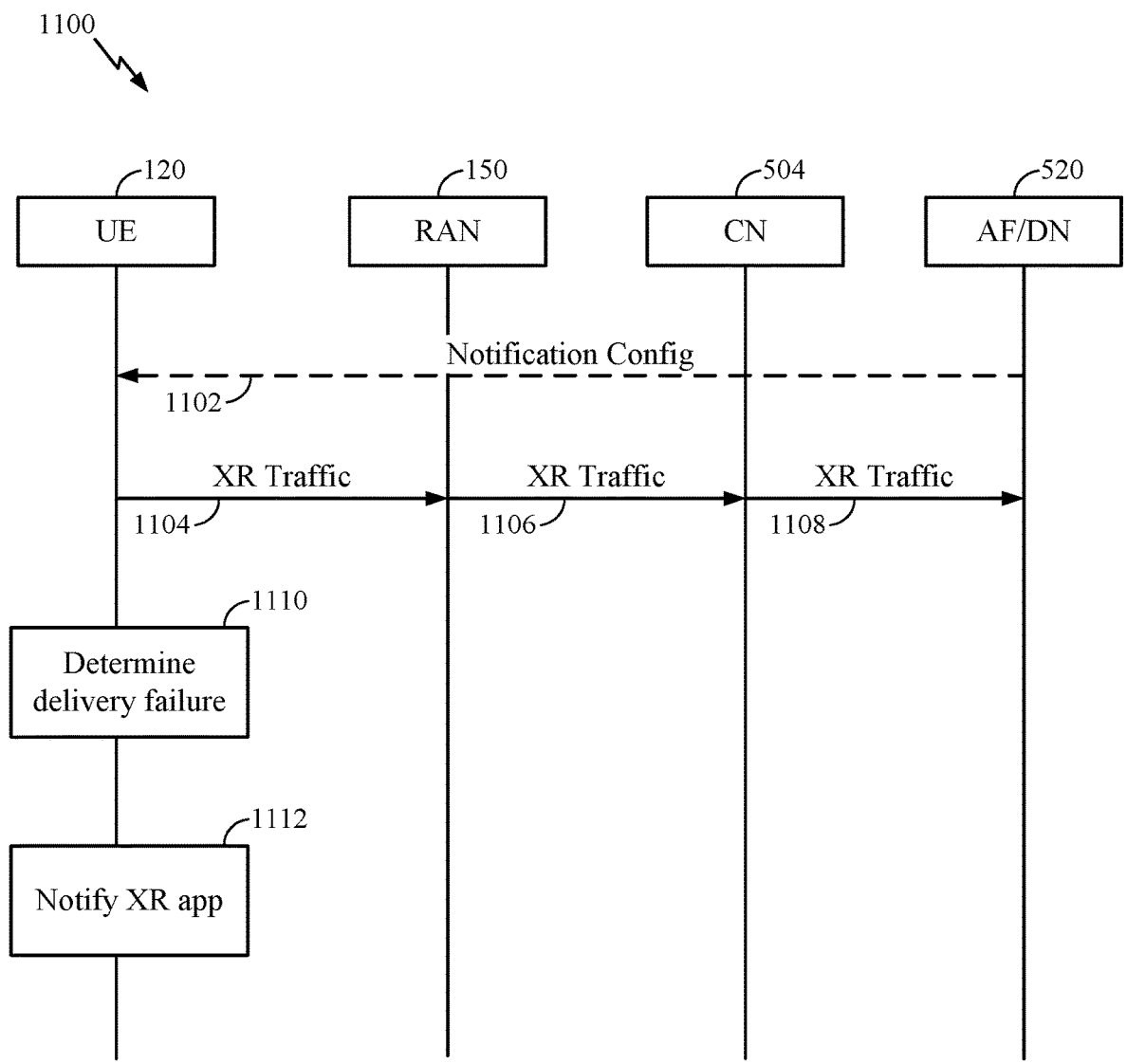
FIG. 11 is a call-flow diagram illustrating example operations for providing file delivery failure notifications on uplink traffic, in accordance with certain aspects of the present disclosure.

FIG. 11 is a call-flow diagram illustrating example operations 1100 for providing file delivery failure notifications on uplink traffic, in accordance with certain aspects of the present disclosure. As shown, at 1102, the server entity 520 may send a notification configuration, as described herein with respect to FIG. 9B, to the UE 120. At 1104, the UE 120 may transmit application traffic (e.g., the traffic flow 700) to the RAN 150. At 1106 the RAN 150 may forward the application traffic to the core network 504, which may also forward the application traffic to the server entity 520 at 1108 (e.g., via the UPF). The uplink transmission of the application traffic may continue through the remainder of the operations 1100.

At 1110, the UE 120 may determine that a delivery failure occurred for one or more files being communicated on the application traffic. For example, the UE 120 may determine that the delivery failure occurred between the RAN 150 and UE 120. At 1112, the UE 120 may send a file delivery failure notification to the application client. In aspects, the UE 120 may generate the notification in accordance with the configuration received at 1102. The application client may then take various actions to rectify the delivery failure or reduce future delivery failures, for example, by resending the file(s) and/or changing the compression scheme of the application traffic.

Figure 12:
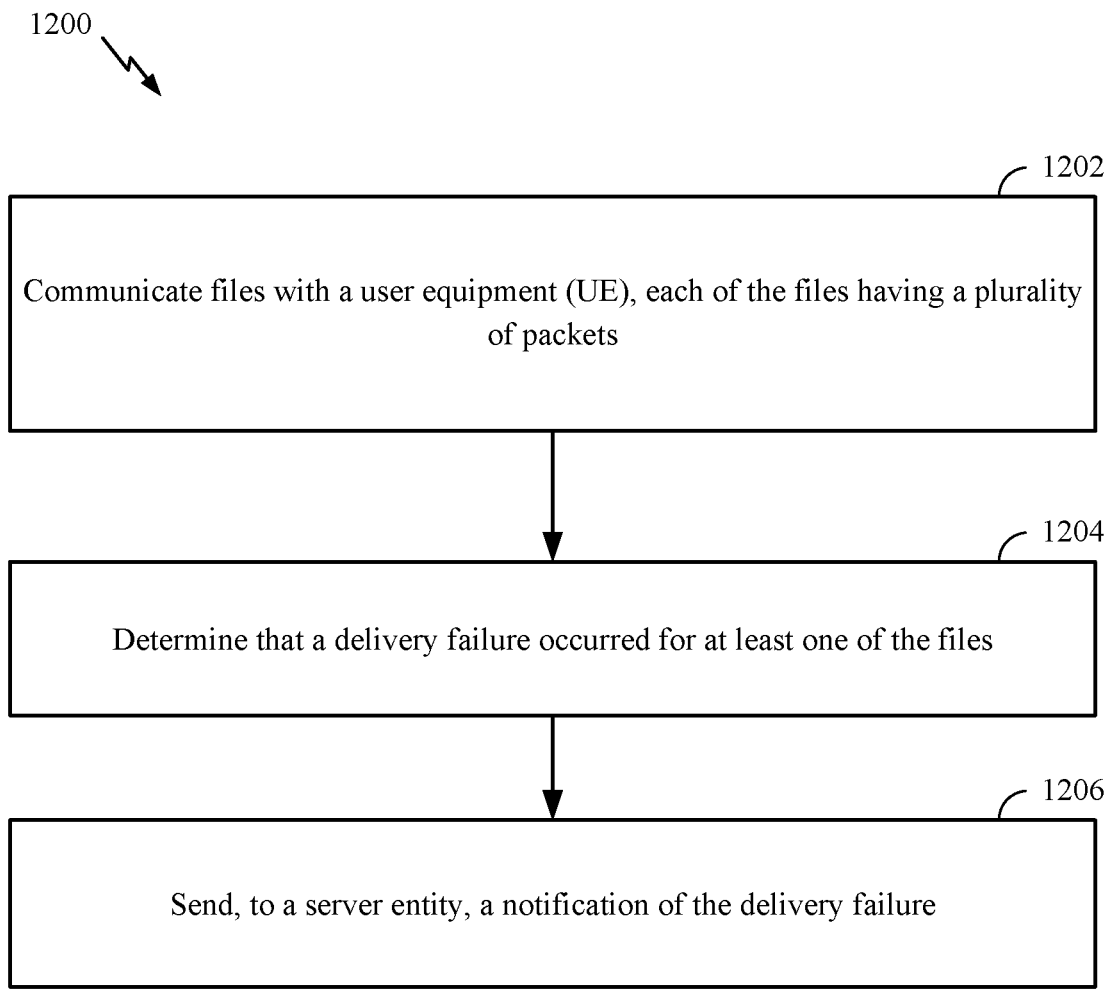
FIG. 12 is a flow diagram illustrating example operations for wireless communication by a network entity, in accordance with certain aspects of the present disclosure.

FIG. 12 is a flow diagram illustrating example operations 1200 for wireless communication by a network entity, in accordance with certain aspects of the present disclosure. The operations 1200 may be performed, for example, by a network entity (e.g., RAN 150 or BS 110). The operations 1200 may be implemented as software components that are executed and run on one or more processors (e.g., controller/processor 1840 of FIG. 18). Further, the transmission and reception of signals by the network entity in operations 1200 may be enabled, for example, by one or more antennas (e.g., antennas 1834 of FIG. 18). In certain aspects, the transmission and/or reception of signals by the network entity may be implemented via a bus interface of one or more processors (e.g., controller/processor 1840) obtaining and/or outputting signals.

The operations 1200 may begin, at 1202, where the network entity may communicate files (e.g., the traffic flow 700) with a UE (e.g., UE 120), each of the files having a plurality of packets. At 1204, the network entity may determine that a delivery failure occurred for at least one of the files. At 1206, the network entity may send, to a server entity (e.g., edge cloud server 520), a notification (e.g., the notification 720) of the delivery failure.

In aspects, the notification may indicate a file identifier (e.g., file identifier 722) associated with the file for which delivery failure occurred. The notification may be for a group of files with the notification indicating identifiers for each of the files in the group. That is, the notification may indicate that the delivery failure occurred for a group of files including the at least one of the files determined at 1204, and the notification may further indicate a file identifier for each of the files in the group.

In accordance with certain aspects, the server entity may configure the file failure delivery feedback as described herein with respect to FIG. 9. For example, the operations 1200 may further include the network entity receiving, from the server entity, a configuration for the notification and generating the notification in accordance with the configuration. The configuration may indicate to send the notification per delivery failure of a file or per delivery failure of a group of files. As an example, if the configuration specifies group-based feedback, the network entity may generate the notification only after multiple file delivery failures are identified. The network entity may receive the configuration from the server entity as described herein with respect to FIG. 9A. That is, the network entity may receive the configuration from an application function (AF) of the server entity. In aspects, the network entity may receive the configuration from the AF via a policy control function (PCF) of a core network, a session management function (SMF) of the core network, and an access and mobility management function (AMF) of the core network.

In aspects, the communication of files at 1202 may include communicating downlink traffic to the UE. For instance, the network entity may generate the files for transmission and transmit the files to the UE as described herein with respect to FIG. 10.

At 1204, the network entity may determine that the delivery failure occurred between the downlink communication link from the RAN to the UE, for example, based on the network entity receiving a negative acknowledgement (NACK) associated with a packet in the file. At 1204, the network entity may determine that the delivery failure occurred between the backhaul communication link from the server entity via the core network to the RAN based on file identifiers in the packets of the traffic flow.

The network entity may send the feedback at 1206 using various feedback paths. For example, the network entity may send the notification to an AF of the server entity as described herein with respect to FIG. 8A. In aspects, the network entity may send the notification to the AF (e.g., AF 524) via logical functions of the core network including an AMF (e.g., AMF 808) of the core network, a SMF (e.g., SMF 806) of the core network, and a PCF (e.g., PCF 804) of the core network. The notification may be sent through a QoS feedback path via a QoS notification (e.g., notification 720) having a field (e.g., file identifier 722) indicating the delivery failure for at least one of the files.

In other aspects, the network entity may send the notification to the data network of the server entity through a UPF (e.g., UPF 810) as described herein with respect to FIG. 8B. The network entity may send the notification to the data network via a message including the notification (e.g., notification 720) and through an interface (e.g., feedback interfaces 820 and 822) in communication with the data network.

Figure 13:
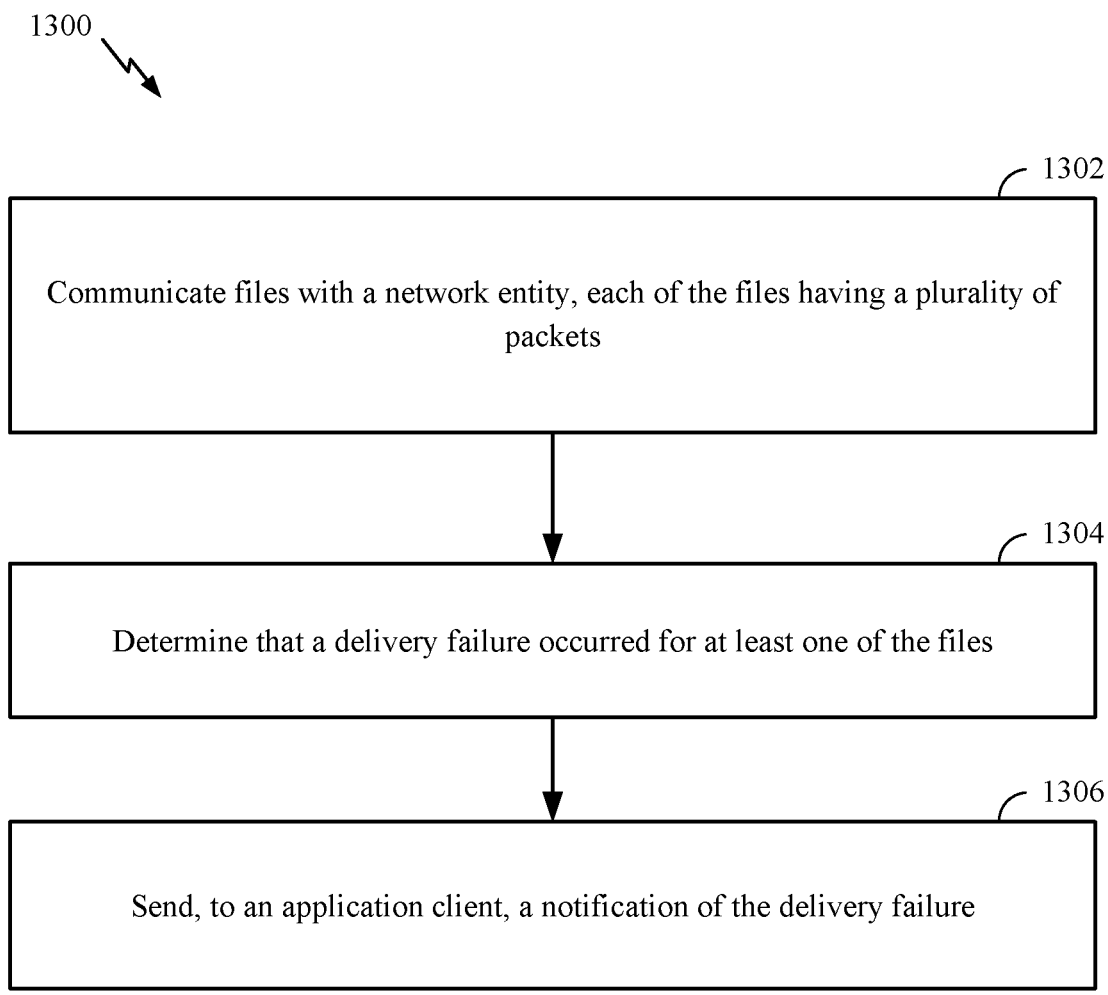
FIG. 13 is a flow diagram illustrating example operations for wireless communication by a user equipment, in accordance with certain aspects of the present disclosure.

FIG. 13 is a flow diagram illustrating example operations 1300 for wireless communication by a user equipment, in accordance with certain aspects of the present disclosure. The operations 1300 may be performed, for example, by a UE (e.g., UE 120). The operations 1300 may be complimentary to the operations 1200 performed by the network entity. The operations 1300 may be implemented as software components that are executed and run on one or more processors (e.g., controller/processor 1880 of FIG. 18). Further, the transmission and reception of signals by the UE in operations 1300 may be enabled, for example, by one or more antennas (e.g., antennas 1852 of FIG. 18). In certain aspects, the transmission and/or reception of signals by the UE may be implemented via a bus interface of one or more processors (e.g., controller/processor 1880) obtaining and/or outputting signals.

The operations 1300 may begin, at 1302, where the UE may communicate files (e.g., the traffic flow 700) with a network entity (e.g., RAN 150 or BS 110), each of the files having a plurality of packets. At 1304, the UE may determine that a delivery failure occurred for at least one of the files. At 1306, the UE may send, to an application client, a notification of the delivery failure.

In aspects, the notification may indicate a file identifier (e.g., file identifier 722) associated with the file for which delivery failure occurred. The notification may be for a group of files with the notification indicating identifiers for each of the files in the group. That is, the notification may indicate that the delivery failure occurred for a group of files including the at least one of the files determined at 1204, and the notification may further indicate a file identifier for each of the files in the group.

In accordance with certain aspects, the server entity may configure the file failure delivery feedback as described herein with respect to FIG. 9B. In certain aspects, the configuration may be specified for uplink traffic feedback. The configuration may indicate to send the notification per delivery failure of a file or per delivery failure of a group of files. The operations 1300 may further include the UE receiving, from the server entity, a configuration for the notification, and the UE may generate the notification in accordance with the configuration. In aspects, the UE may receive the configuration from an application function (AF) of the server entity. In certain aspects, the UE may receive the configuration from the AF via a policy control function (PCF) of a core network, a session management function (SMF) of the core network, and an access and mobility management function (AMF) of the core network. As an example, if the configuration specifies group-based feedback, the UE may generate the notification only after multiple file delivery failures are identified.

In aspects, the communication of files at 1302 may include communicating uplink traffic to the network entity. For instance, the UE may generate the files for transmission and transmit the files to the network entity as described herein with respect to FIG. 11.

At 1304, the UE may determine that the delivery failure occurred between the uplink communication link from the UE to the RAN, for example, based on the UE receiving a NACK associated with a packet in the file. At 1306, the UE may send the notification using the feedback path as described herein with respect to FIG. 8C.

Example Techniques for Providing Application Feedback

In some cases, a quality of service (QoS) notification message may be sent from the 5G system to AF 524. For instance, the QoS notification message may be communicated from the RAN 110 to a session management function (SMF) of the CN 504, to the PCF of the CN 504, to the policy control function (PCF) of the CN 504, and to the AF 524. In some cases, the QoS notification message may indicate that a preconfigured GFBR can no longer be handled. The 5G system may then be expected to continue serving the traffic flow waiting for the AF 524 to take further action in response to the QoS notification.

In certain aspects of the present disclosure, the 5G system may determine a temporary degradation (TD) event associated with communication of data packets. For instance, the TD event may be associated with a temporary degradation of a target metric such as a preconfigured GFBR, a preconfigured PER, or a preconfigured PDB, as described in more detail herein. In other words, instead of merely indicating that a preconfigured metric, such as GFBR, can no longer be handled, the RAN may instead indicate a TD associated with the preconfigured metric, and optionally, indicate a duration associated with the TD event, as described in more detail herein. In aspects, the TD event feedback may enable the AF or DN to take various actions to alleviate the degradation of the service at the UE, such as changing the compression scheme of the traffic flow, reducing the application bit-rate, or the like.

Figure 14:
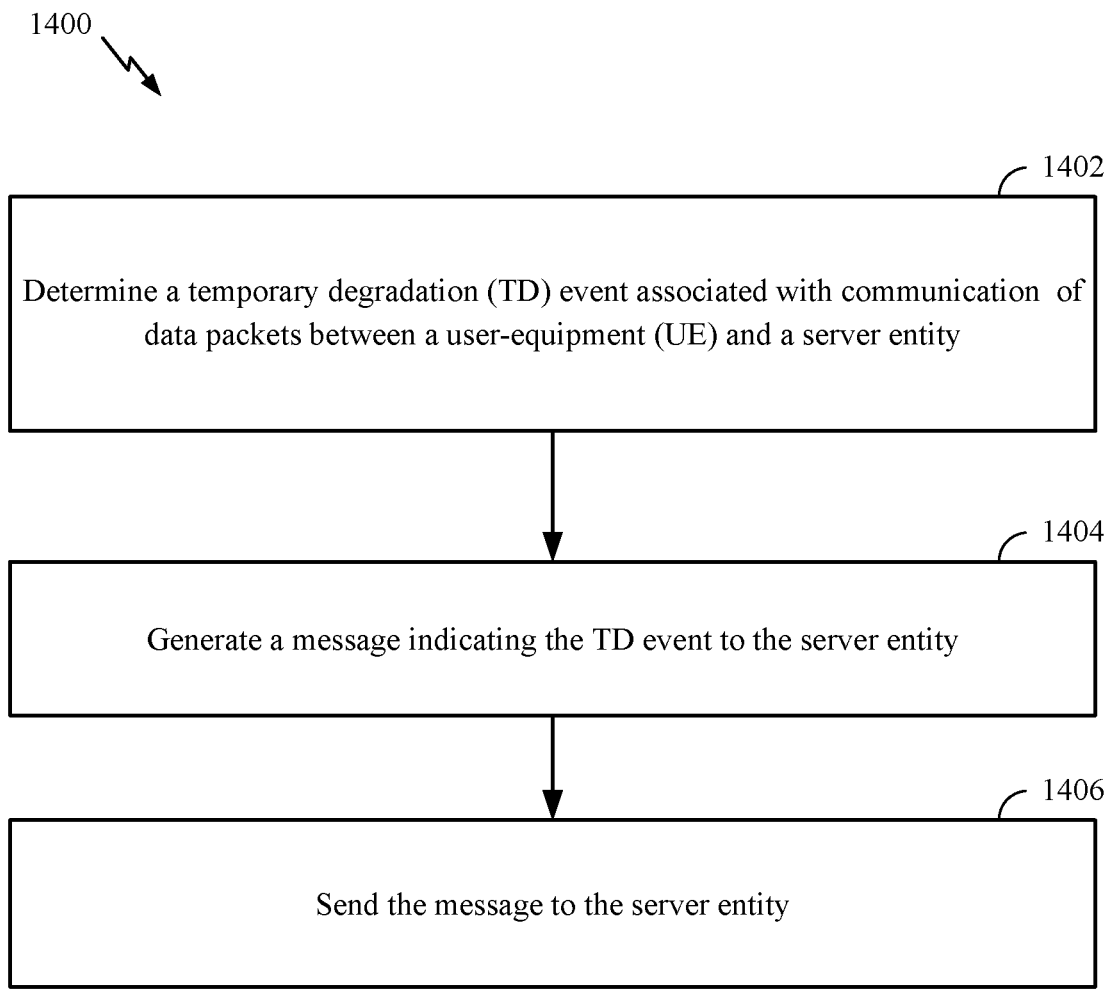
FIG. 14 is a flow diagram illustrating example operations for wireless communication, in accordance with certain aspects of the present disclosure.

FIG. 14 is a flow diagram illustrating example operations 1400 for wireless communication, in accordance with certain aspects of the present disclosure. The operations 1400 may be performed, for example, by a radio access network (RAN) such as a BS (e.g., the BS 110 in the wireless communication network 100) and/or a network controller (e.g., the network controller 160). Operations 1400 may be implemented as software components that are executed and run on one or more processors (e.g., controller/processor 1840 of FIG. 18). Further, the transmission and reception of signals by the BS in operations 1400 may be enabled, for example, by one or more antennas (e.g., antennas 1834 of FIG. 18). In certain aspects, the transmission and/or reception of signals by the BS may be implemented via a bus interface of one or more processors (e.g., controller/processor 1840) obtaining and/or outputting signals.

The operations 1400 may begin, at block 1402, by the RAN determining a TD event associated with communication of data packets between a UE and a server entity (e.g., the edge cloud server 520). In certain aspects, the TD event may be associated with a TD of at least one of a preconfigured GFBR, a preconfigured PER, or a preconfigured PDB. In some cases, the TD event may be associated with a TD of at least one of a preconfigured GFBR, a preconfigured file error rate (FER), or a preconfigured file delay budget (FDB). As described herein, one or more packets may be associated with a file. A FER generally refers to an error rate associated with a file, as opposed to a PER which refers to the error rate at the packet level. Similarly, FDB generally refers to a delay budget associated with a file, as opposed to a PDB which refers to the delay budget of packets. For instance, the TD event may be associated with at least one of a temporarily higher PDB (or FDB) for the communication of the data packets, temporarily higher PER (or FER) for the communication of the data packets, or temporarily higher GFBR for the communication of the data packets.

At block 1404, the RAN generates a message (e.g., a QoS notification message) indicating the TD event to the server entity, and at block 1406, the RAN sends the message to the server entity. In certain aspects, the message may indicate a duration associated with the TD event. In some cases, the message may indicate a start time of the TD event. For instance, the start time of the TD event may be indicated when the network entity (e.g., RAN 110) and the server entity (e.g., the edge cloud server 520) are operating using a common clock or operating using synchronized clocks. In otherwords, a time stamp indicating the start of the TD event as conveyed by the RAN 110 may be properly processed by the edge cloud server 520 when the RAN and the edge cloud server are operating using a common clock or synchronized clocks.

In certain aspects, the message may be sent earlier than the start of the TD event. In other words, the TD event may be anticipated or predicted based on one or more TD event trigger conditions. For example, the TD event trigger conditions may include a mobility event (e.g., the UE handing over from one cell to another), or an overheating condition (e.g., the UE overheating due to increase power usage which may be indicated by the UE to the RAN). In response to the indication of the TD event, the application may either do nothing if the user experience degradation during TD even duration is acceptable, or temporarily (e.g., for the duration of the TD event) reduce the application bit-rate.

Figure 15A:
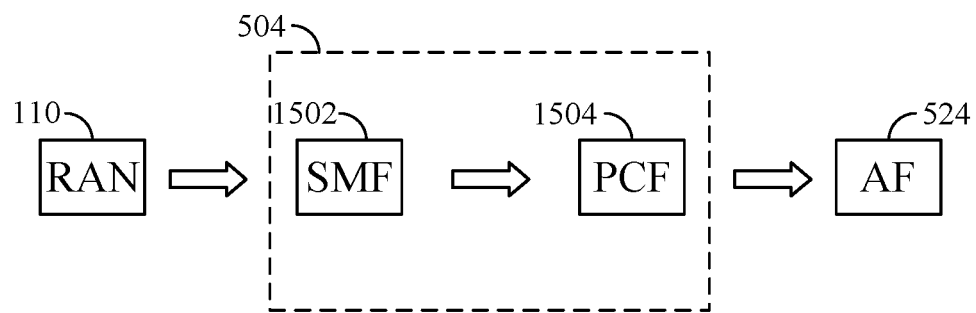
FIGS. 15A and 15B illustrate notification paths for indicating a temporary degradation (TD) event, in accordance with certain aspects of the present disclosure.
Figure 15B:
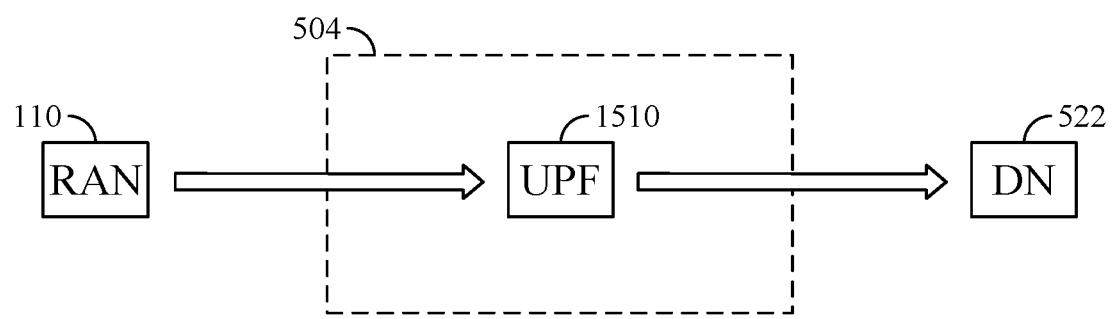

FIGS. 15A and 15B illustrate notification paths for indicating a TD event, in accordance with certain aspects of the present disclosure. As illustrated in FIG. 15A, the message (e.g., QoS notification message) conveying the TD event may be indicated by the RAN 110 to the AF 524 via the session management function (SMF) 1502 of the CN 504 and via the policy control function (PCF) 1504 of the CN 504, as illustrated. The TD event indicated to the AF 524 may also be conveyed by the AF 524 to the DN 522 for management of the application based on the conveyed TD event. As illustrated in FIG. 15B, the message (e.g. QoS notification message) conveying the TD event may be indicated to the DN 522 via the user-plane function (UPF) 1510 of the CN 504.

Figure 16:
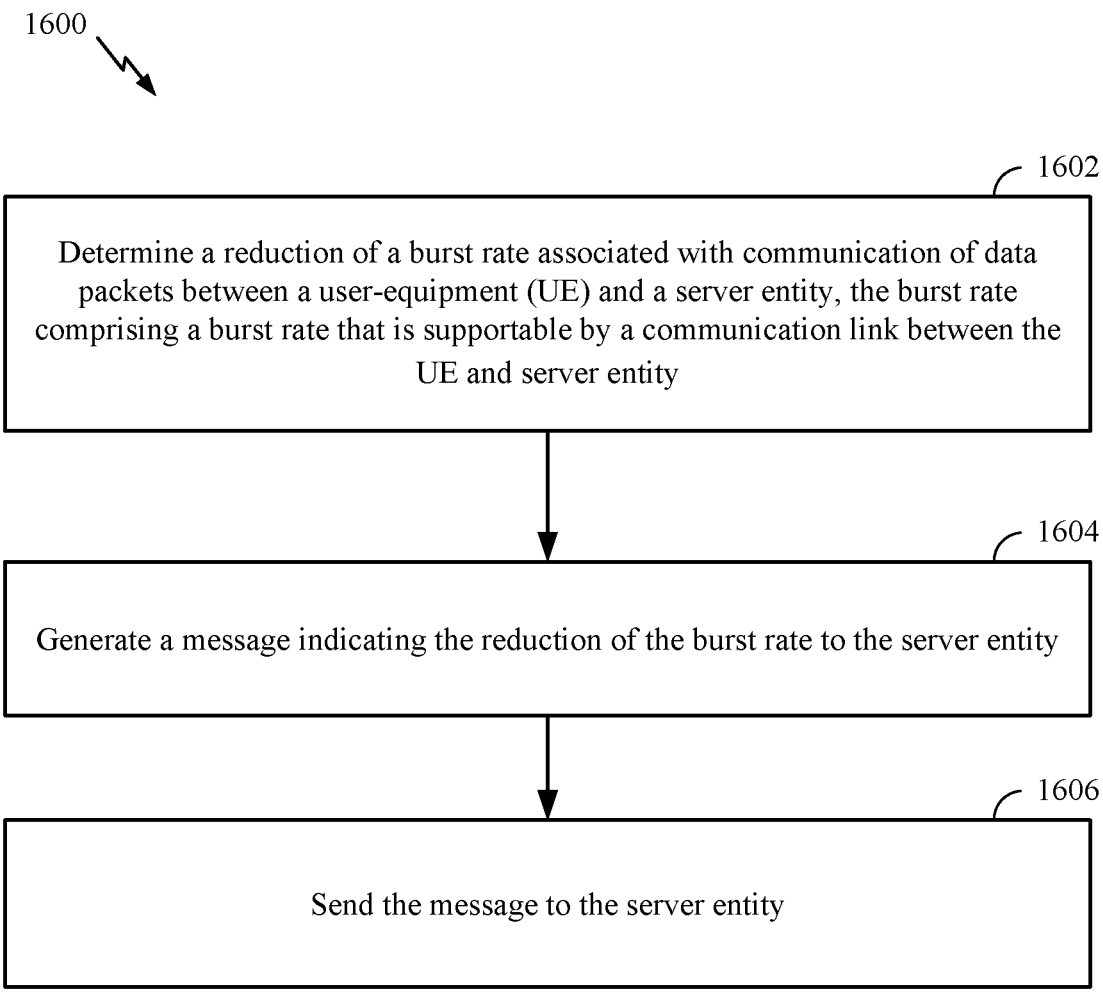
FIG. 16 is a flow diagram illustrating example operations for wireless communication, in accordance with certain aspects of the present disclosure.

FIG. 16 is a flow diagram illustrating example operations 1600 for wireless communication, in accordance with certain aspects of the present disclosure. The operations 1600 may be performed, for example, by a radio access network (RAN) such as a BS (e.g., the BS 110 in the wireless communication network 100) and/or a network controller (e.g., the network controller 160). Operations 1600 may be implemented as software components that are executed and run on one or more processors (e.g., controller/processor 1840 of FIG. 18). Further, the transmission and reception of signals by the BS in operations 1600 may be enabled, for example, by one or more antennas (e.g., antennas 1834 of FIG. 18). In certain aspects, the transmission and/or reception of signals by the BS may be implemented via a bus interface of one or more processors (e.g., controller/processor 1840) obtaining and/or outputting signals.

The operations 1600 may begin, at block 1602, by the RAN determining a reduction of a burst rate associated with communication of data packets between a UE and a server entity, the burst rate comprising a burst rate that is supportable by a communication link between the UE and server entity. In some cases, the determination of the reduction of the burst rate may include anticipating the reduction of the burst rate based on a mobility event or a heating condition of the UE. In some cases, the reduction of the burst rate may be predicted based on one or more trigger conditions, such as a mobility event or a heating condition of the UE.

At block 1604, the RAN generates a message (e.g., QoS notification message) indicating the reduction of the burst rate to the server entity, and at block 1606, the RAN sends the message to the server entity. In certain aspects, the determination of the reduction of the burst rate may include determining a TD event, the reduction of the burst rate being a temporary reduction of a preconfigured burst rate during the TD event.

In some cases, a supportable GFBR (e.g., associated with a burst rate) may be indicated to the server entity (e.g., edge cloud server) when a preconfigured GFBR cannot be supported. In certain aspects of the present disclosure, the RAN may also indicate whether a determined reduction of the burst rate is a TD event or not. When the reduction of the burst rate is TD event, the message may indicate a duration associated with the TD event (e.g., a duration associated with the reduction of the burst rate). The message may also indicate a time of occurrence of the reduction of the burst rate when the network entity and the server entity are operating using a common clock or operating using synchronized clocks.

As described with respect to FIG. 15A, the message (e.g., QoS notification message) may be indicated by the RAN 110 to the AF 524 via the SMF 1502 of the CN 504 and via the PCF 1504 of the CN 504, as illustrated. As illustrated in FIG. 15B, the message (e.g. QoS notification message) may be indicated to the DN 522 via the UPF 1510 of the CN 504. In response, the application may adjust the peak to average of the generated traffic to reduce required burst-rate. For example, with a PDB of 10 ms, the application may reduce the average of the burst rate of packets across 10 ms time periods to the peak burst rate across the 10 ms time periods, effectively reducing the required burst-rate for the traffic. While examples described herein have described techniques for conveying a TD event for a 5G system to facilitate understanding, the techniques described herein may be applied for any of various suitable radio access technologies.

Figure 17:
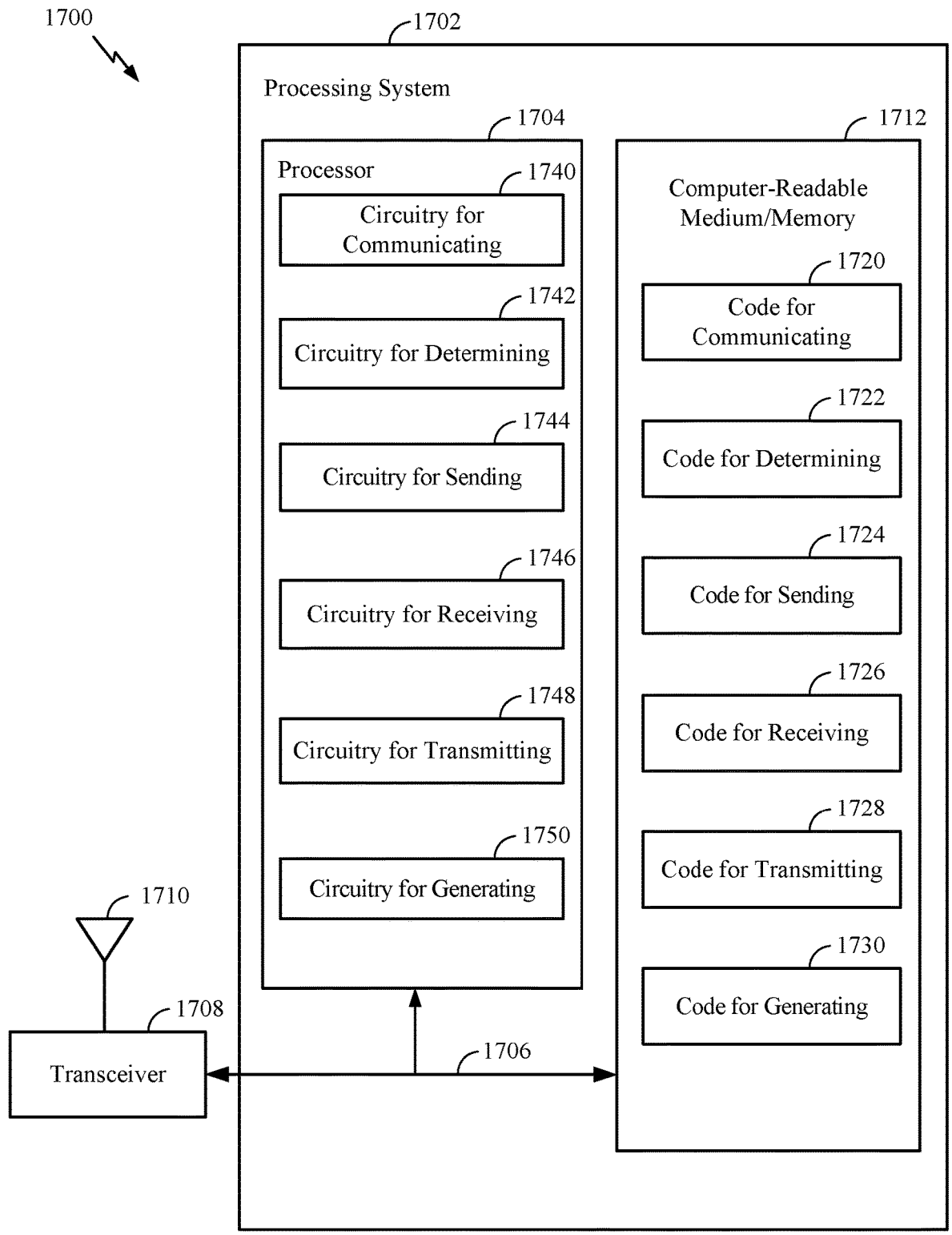
FIG. 17 illustrates a communications device that may include various components configured to perform operations for the techniques disclosed herein in accordance with aspects of the present disclosure.

FIG. 17 illustrates a communications device 1700 (e.g., BS 110, UE 120, or RAN 150) that may include various components (e.g., corresponding to means-plus-function components) configured to perform operations for the techniques disclosed herein, such as the operations illustrated in FIGS. 10-13, 14 and 16. The communications device 1700 includes a processing system 1702 coupled to a transceiver 1708. The transceiver 1708 is configured to transmit and receive signals for the communications device 1700 via an antenna 1710, such as the various signals as described herein. The processing system 1702 may be configured to perform processing functions for the communications device 1700, including processing signals received and/or to be transmitted by the communications device 1700.

The processing system 1702 includes a processor 1704 coupled to a computer-readable medium/memory 1712 via a bus 1706. In certain aspects, the computer-readable medium/memory 1712 is configured to store instructions (e.g., computer-executable code) that when executed by the processor 1704, cause the processor 1704 to perform the operations illustrated in FIGS. 10-14 and 16, or other operations for performing the various techniques discussed herein. In certain aspects, computer-readable medium/memory 1712 stores code for communicating 1720, code for determining 1722, code for sending 1724, code for receiving 1726, code for transmitting 1728, and/or code for generating 1730. In certain aspects, the processor 1704 has circuitry configured to implement the code stored in the computer-readable medium/memory 1712. The processor 1704 includes circuitry for communicating 1740, circuitry for determining 1742, circuitry for sending 1744, circuitry for receiving 1746, circuitry for transmitting 1748, and/or circuitry for generating 1750.

Figure 18:
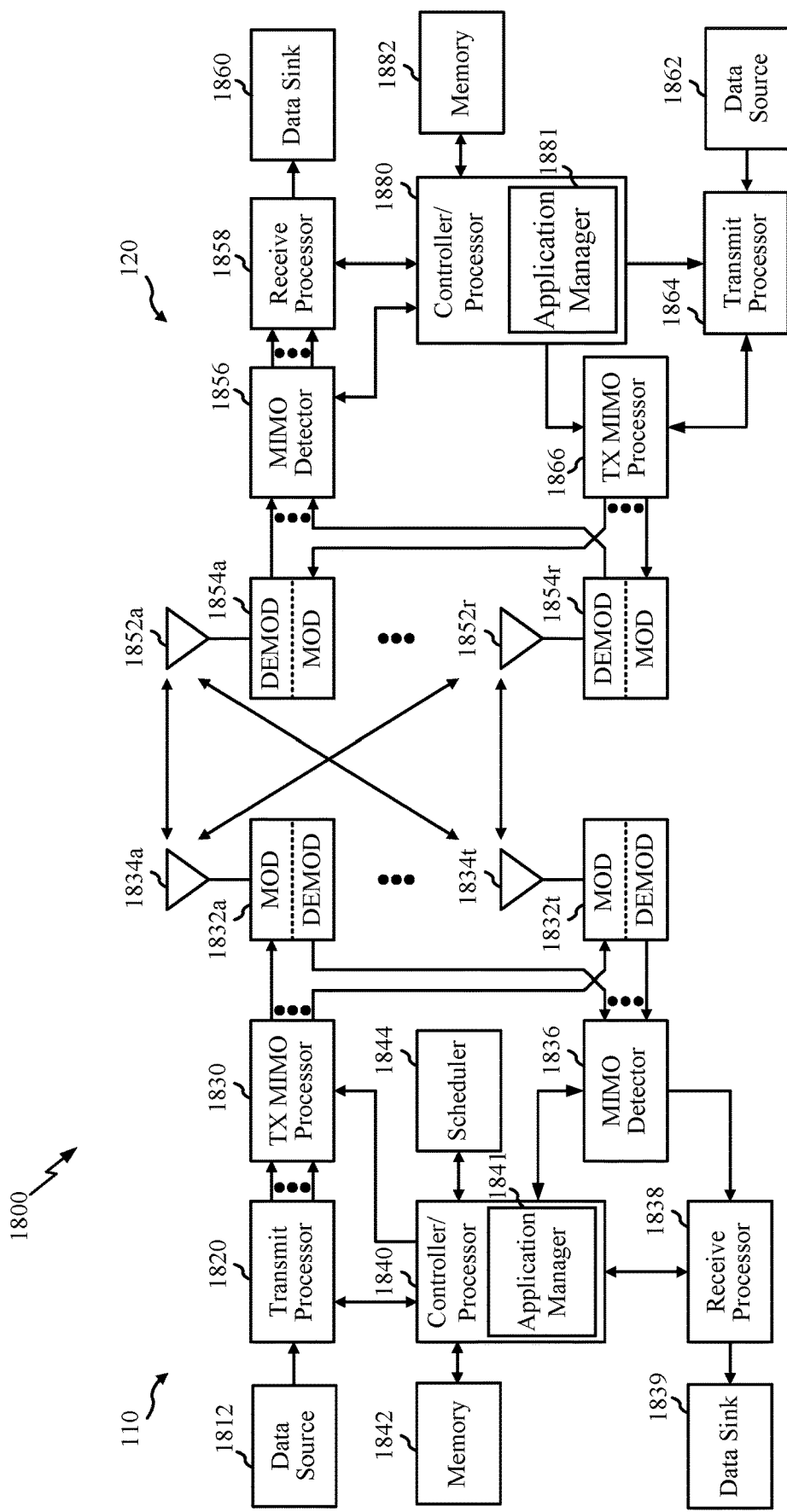
FIG. 18 is a block diagram conceptually illustrating a design of an example base station and user equipment, in accordance with certain aspects of the present disclosure.

FIG. 18 illustrates example components of BS 110 and UE 120 (e.g., in the wireless communication network 100 of FIG. 1), which may be used to implement aspects of the present disclosure. For example, antennas 1852, processors 1866, 1858, 1864, and/or controller/processor 1880 of the UE 120 and/or antennas 1834, processors 1820, 1830, 1838, and/or controller/processor 1840 of the BS 110 may be used to perform the various techniques and methods described herein. For example, as shown in FIG. 18, the controller/processor 1840 of the BS 110 has an application manager that may be configured for file-based services such as XR, according to aspects described herein. The controller/processor 1880 of the UE 120 has an application manager that may be configured for file-based services such as XR, according to aspects described herein.

At the BS 110, a transmit processor 1820 may receive data from a data source 1812 and control information from a controller/processor 1840. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 1820 may process (e.g., encode and symbol map) the data and control information to obtain data symbols and control symbols, respectively. The transmit processor 1820 may also generate reference symbols, such as for the primary synchronization signal (PSS), secondary synchronization signal (SSS), and cell-specific reference signal (CRS). A transmit (TX) multiple-input multiple-output (MIMO) processor 1830 may perform spatial processing (e.g., precoding) on the data symbols, the control symbols, and/or the reference symbols, if applicable, and may provide output symbol streams to the modulators (MODs) 1832a-1832t. Each modulator 1832 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 1832a-1832t may be transmitted via the antennas 1834a-1834t, respectively.

At the UE 120, the antennas 1852a-1852r may receive the downlink signals from the BS 110 and may provide received signals to the demodulators (DEMODs) in transceivers 1854a-1854r, respectively. Each demodulator 1854 may condition (e.g., filter, amplify, downconvert, and digitize) a respective received signal to obtain input samples. Each demodulator may further process the input samples (e.g., for OFDM, etc.) to obtain received symbols. A MIMO detector 1856 may obtain received symbols from all the demodulators 1854a-1854r, perform MIMO detection on the received symbols if applicable, and provide detected symbols. A receive processor 1858 may process (e.g., demodulate, deinterleave, and decode) the detected symbols, provide decoded data for the UE 120 to a data sink 1860, and provide decoded control information to a controller/processor 1880.

On the uplink, at UE 120, a transmit processor 1864 may receive and process data (e.g., for the physical uplink shared channel (PUSCH)) from a data source 1862 and control information (e.g., for the physical uplink control channel (PUCCH) from the controller/processor 1880. The transmit processor 1864 may also generate reference symbols for a reference signal (e.g., for the sounding reference signal (SRS)). The symbols from the transmit processor 1864 may be precoded by a TX MIMO processor 1866 if applicable, further processed by the demodulators in transceivers 1854a-1854r (e.g., for SC-FDM, etc.), and transmitted to the base station 110. At the BS 110, the uplink signals from the UE 120 may be received by the antennas 1834, processed by the modulators 1832, detected by a MIMO detector 1836 if applicable, and further processed by a receive processor 1838 to obtain decoded data and control information sent by the UE 120. The receive processor 1838 may provide the decoded data to a data sink 1839 and the decoded control information to the controller/processor 1840.

The controllers/processors 1840 and 1880 may direct the operation at the BS 110 and the UE 120, respectively. The controller/processor 1840 and/or other processors and modules at the BS 110 may perform or direct the execution of processes for the techniques described herein. The memories 1842 and 1882 may store data and program codes for BS 110 and UE 120, respectively. A scheduler 1844 may schedule UEs for data transmission on the downlink and/or uplink.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably.

A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2).

The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

A BS may be a station that communicates with user equipment (UEs). Each BS may provide communication coverage for a particular geographic area. In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. In some examples, a cell may not necessarily be stationary, and the geographic area of the cell may move according to the location of a mobile BS. In some examples, the BSs may be interconnected to one another and/or to one or more other BSs or network nodes in a wireless communication network through various types of backhaul interfaces, such as a direct physical connection, a wireless connection, a virtual network, or the like using any suitable transport network.

A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A wireless communication network may be a heterogeneous network that includes BSs of different types, e.g., macro BS, pico BS, femto BS, relays, etc. These different types of BSs may have different transmit power levels, different coverage areas, and different impact on interference in the wireless communication network. For example, macro BS may have a high transmit power level (e.g., 20 Watts) whereas pico BS, femto BS, and relays may have a lower transmit power level (e.g., 1 Watt).

A wireless communication network may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, ... slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

NR may utilize OFDM with a CP on the uplink and downlink and include support for half-duplex operation using TDD. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 10-14 and 16.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication, comprising:
a transceiver configured to:
communicate files with one of a network entity or a user equipment (UE), each of the files having a plurality of packets, and
receive a configuration for a notification of a delivery failure for at least one of the files; and
a processing system configured to:
determine that the delivery failure occurred for the at least one of the files, and
send, to one of an application client or a server entity, the notification of the delivery failure, wherein the notification is sent to a data network of the server entity via a user plane function (UPF) of a core network when the configuration is a first configuration and an application function (AF) of the server entity when the configuration is a second configuration.

2. The apparatus of claim 1, wherein the notification indicates a file identifier associated with the at least one of the files.

3. The apparatus of claim 1, wherein the notification indicates that the delivery failure occurred for a group of the files including the at least one of the files, and the notification further indicates a file identifier for each of the files in the group.

4. The apparatus of claim 1, wherein:
the transceiver is configured to receive, from the core network or the AF of the server entity, the configuration for the notification; and
the processing system is configured to generate the notification in accordance with the configuration.

5. The apparatus of claim 4, wherein the configuration indicates to send the notification per delivery failure of a file or per delivery failure of a group of files.

6. The apparatus of claim 4, wherein the configuration indicates a feedback path for the notification either to the AF of the server entity or to the data network of the server entity via the UPF of the core network.

7. The apparatus of claim 4, wherein the transceiver is configured to receive the configuration from the AF via a policy control function (PCF) of the core network, a session management function (SMF) of the core network, and an access and mobility management function (AMF) of the core network.

8. The apparatus of claim 1, wherein:
the processing system is configured to send the notification to the AF of the server entity via an access and mobility management function (AMF) of the core network, a session management function (SMF) of the core network, and a policy control function (PCF) of the core network; and
the notification is a quality-of-service notification including a field indicating the delivery failure for at least one of the files.

9. The apparatus of claim 1, wherein the processing system is configured to send the notification to the data network of the server entity via a message including the notification and through an interface in communication with the data network.

10. A method for wireless communication, comprising:
communicating files with one of a network entity or a user equipment (UE), each of the files having a plurality of packets;
receiving a configuration for a notification of a delivery failure for at least one of the files;
determining that the delivery failure occurred for the at least one of the files, and
sending, to one of an application client or a server entity, the notification of the delivery failure, wherein the notification is sent to a data network of the server entity via a user plane function (UPF) of a core network when the configuration is a first configuration and an application function (AF) of the server entity when the configuration is a second configuration.

11. The method of claim 10, wherein the notification indicates a file identifier associated with the at least one of the files.

12. The method of claim 10, wherein the notification indicates that the delivery failure occurred for a group of the files including the at least one of the files, and the notification further indicates a file identifier for each of the files in the group.

13. The method of claim 10, further comprising:
receiving, from the core network or the AF of the server entity, the configuration for the notification; and
generating the notification in accordance with the configuration.

14. The method of claim 13, wherein the configuration indicates to send the notification per delivery failure of a file or per delivery failure of a group of files.

15. The method of claim 13, wherein the configuration indicates a feedback path for the notification either to the AF of the server entity or to the data network of the server entity via the UPF of the core network.

16. The method of claim 13, wherein the configuration is received from the AF via a policy control function (PCF) of the core network, a session management function (SMF) of the core network, and an access and mobility management function (AMF) of the core network.

17. The method of claim 10, wherein the notification is sent to the AF of the server entity via an access and mobility management function (AMF) of the core network, a session management function (SMF) of the core network, and a policy control function (PCF) of the core network; and the notification is a quality-of-service notification including a field indicating the delivery failure for at least one of the files.

18. An apparatus for wireless communication, comprising:
means for communicating files with one of a network entity or a user equipment (UE), each of the files having a plurality of packets;
means for receiving a configuration for a notification of a delivery failure for at least one of the files;
means for determining that the delivery failure occurred for the at least one of the files, and
means for sending, to one of an application client or a server entity, the notification of the delivery failure, wherein the notification is sent to a data network of the server entity via a user plane function (UPF) of a core network when the configuration is a first configuration and an application function (AF) of the server entity when the configuration is a second configuration.

19. The apparatus of claim 18, wherein the notification indicates a file identifier associated with the at least one of the files.

20. The apparatus of claim 18, wherein the notification indicates that the delivery failure occurred for a group of the files including the at least one of the files, and the notification further indicates a file identifier for each of the files in the group.

21. The apparatus of claim 18, further comprising:
means for receiving, from the core network or the AF of the server entity, the configuration for the notification; and
means for generating the notification in accordance with the configuration.

22. The apparatus of claim 21, wherein the configuration indicates to send the notification per delivery failure of a file or per delivery failure of a group of files.

23. The apparatus of claim 21, wherein the configuration indicates a feedback path for the notification either to the AF of the server entity or to the data network of the server entity via the UPF of the core network.

24. The apparatus of claim 21, wherein the configuration is received from the AF via a policy control function (PCF) of the core network, a session management function (SMF) of the core network, and an access and mobility management function (AMF) of the core network.

25. The apparatus of claim 18, wherein the notification is sent to the AF of the server entity via an access and mobility management function (AMF) of the core network, a session management function (SMF) of the core network, and a policy control function (PCF) of the core network; and the notification is a quality-of-service notification including a field indicating the delivery failure for at least one of the files.

* * * * *